(12) United States Patent
Curtis et al.

(10) Patent No.: US 9,656,621 B2
(45) Date of Patent: May 23, 2017

(54) SYSTEM AND METHOD FOR SENSOR MODULE POWER MANAGEMENT

(71) Applicant: Pearl Automation Inc., Scotts Valley, CA (US)

(72) Inventors: Robert Curtis, Scotts Valley, CA (US); Saket Vora, Scotts Valley, CA (US); Brian Sander, Scotts Valley, CA (US); Joseph Fisher, Scotts Valley, CA (US); Bryson Gardner, Scotts Valley, CA (US); Tyler Mincey, Scotts Valley, CA (US); Ryan Du Bois, Scotts Valley, CA (US); Rishabh Bhargava, Scotts Valley, CA (US); Patrick Carroll, Scotts Valley, CA (US); Brian Sutton, Scotts Valley, CA (US)

(73) Assignee: Pearl Automation Inc., Scotts Valley, CA (US)

( * ) Notice: Subject to any disclaimer, the term of this patent is extended or adjusted under 35 U.S.C. 154(b) by 0 days.

(21) Appl. No.: 15/265,295

(22) Filed: Sep. 14, 2016

(65) Prior Publication Data

US 2017/0088072 A1 Mar. 30, 2017

Related U.S. Application Data

(60) Provisional application No. 62/218,223, filed on Sep. 14, 2015, provisional application No. 62/351,868, filed on Jun. 17, 2016.

(51) Int. Cl.
*B60R 16/033* (2006.01)
*G08B 21/18* (2006.01)
*H02J 7/00* (2006.01)
*H02J 3/38* (2006.01)

(52) U.S. Cl.
CPC .......... *B60R 16/033* (2013.01); *G08B 21/182* (2013.01); *H02J 7/007* (2013.01); *H02J 3/383* (2013.01); *H02J 2007/0096* (2013.01)

(58) Field of Classification Search
CPC .......... B60R 2300/40; B60R 2300/404; B60R 2300/406
USPC ....................................................... 348/148
See application file for complete search history.

(56) References Cited

U.S. PATENT DOCUMENTS

| | | | |
|---|---|---|---|
| 5,670,935 A | 9/1997 | Schofield et al. | |
| 7,511,607 B2 | 3/2009 | Hubbard et al. | |
| 9,041,806 B2 | 5/2015 | Baur et al. | |
| 9,226,115 B2 | 12/2015 | Raghunathan et al. | |
| 2002/0030591 A1 | 3/2002 | Paranjpe | |
| 2006/0098094 A1* | 5/2006 | Lott | B60R 1/00 348/148 |

(Continued)

FOREIGN PATENT DOCUMENTS

JP 2013256167 A 12/2013

*Primary Examiner* — Fritz M Fleming
(74) *Attorney, Agent, or Firm* — Jeffrey Schox; Diana Lin

(57) ABSTRACT

A method for power management for a retrofit sensor system for a vehicle, the retrofit sensor system including a sensor module that includes a sensor, an energy storage module, an energy harvester, and a wireless communication module. The method includes: determining a driving state predictive of a driving event; operating the sensor module in a mid-power mode; receiving a trigger; operating the sensor module in a high-power mode; wirelessly transmitting data at the sensor module; and operating the sensor module in a low-power mode.

20 Claims, 10 Drawing Sheets

(56) References Cited

U.S. PATENT DOCUMENTS

| | | |
|---|---|---|
| 2007/0126216 A1 | 6/2007 | Nakamura et al. |
| 2009/0040300 A1* | 2/2009 | Scribner ................ B60R 1/003 |
| | | 348/148 |
| 2009/0069973 A1 | 3/2009 | Li |
| 2009/0112396 A1 | 4/2009 | Tsai et al. |
| 2010/0188932 A1 | 7/2010 | Hanks et al. |
| 2010/0292886 A1 | 11/2010 | Szczerba et al. |
| 2011/0013020 A1* | 1/2011 | Jo ............................ B60R 1/00 |
| | | 348/148 |
| 2013/0083196 A1 | 4/2013 | Zheng |
| 2014/0119712 A1 | 5/2014 | Jang et al. |
| 2014/0121883 A1 | 5/2014 | Shen et al. |
| 2014/0152828 A1* | 6/2014 | Plante ................... B60R 16/03 |
| | | 348/148 |
| 2014/0198214 A1 | 7/2014 | Maruoka et al. |
| 2014/0223423 A1 | 8/2014 | Alsina et al. |
| 2015/0081344 A1 | 3/2015 | Lee |
| 2016/0021312 A1* | 1/2016 | Kim ................... H04N 13/0239 |
| | | 348/148 |
| 2016/0039364 A1 | 2/2016 | Findlay et al. |

* cited by examiner

SYSTEM AND METHOD FOR SENSOR MODULE POWER MANAGEMENT

CROSS-REFERENCE TO RELATED APPLICATIONS

This application claims the benefit of U.S. Provisional Application No. 62/218,223 filed 14 Sep. 2015 and U.S. Provisional Application No. 62/351,868 filed 17 Jun. 2016, which are incorporated in their entireties by this reference. This application incorporates U.S. application Ser. No. 15/146,705, filed 4 May 2016, herein in its entirety by this reference.

TECHNICAL FIELD

This invention relates generally to the vehicle field, and more specifically to a new and useful system and method for sensor module power management in the vehicle field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
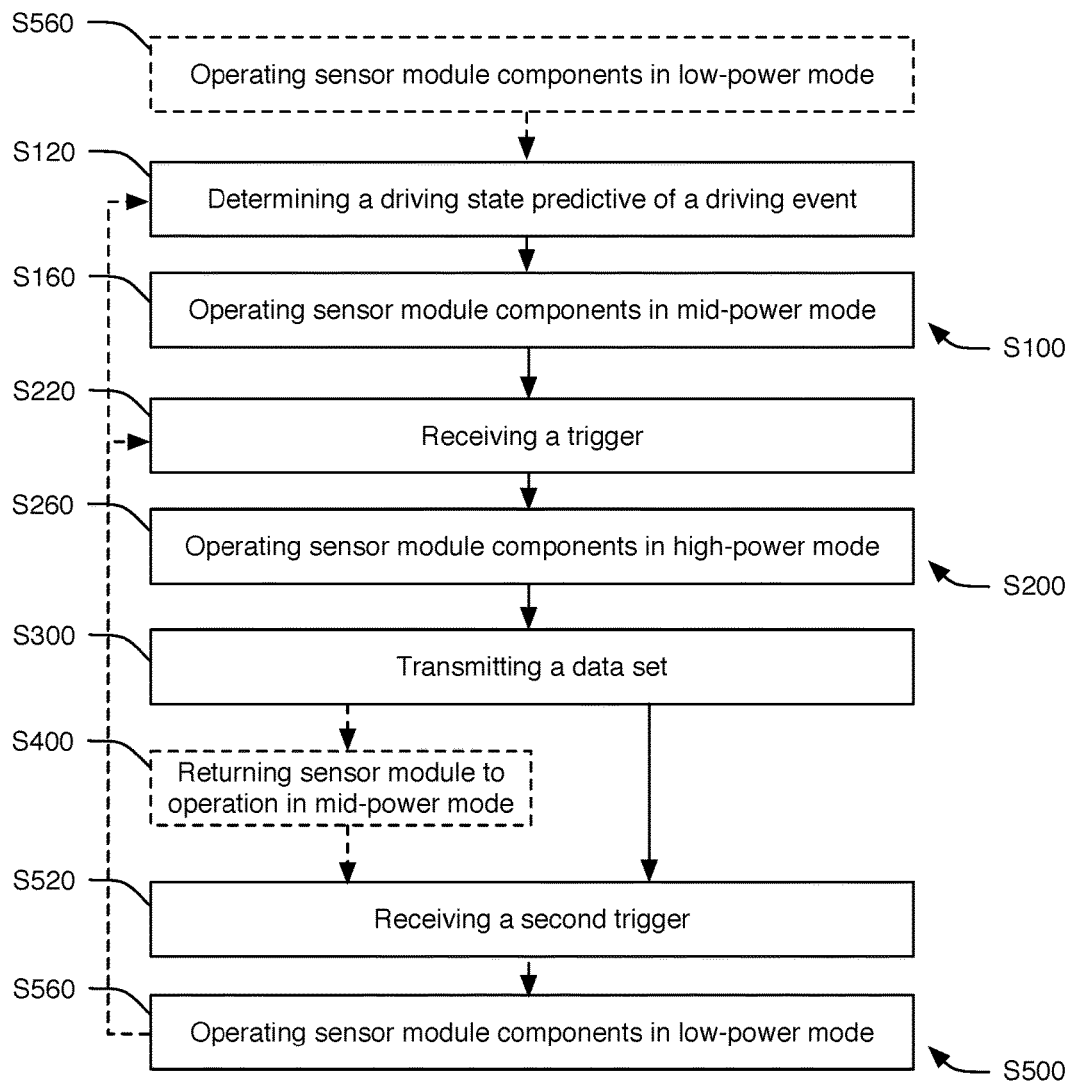
FIG. 1 is a flowchart diagram of the method of selective vehicle sensor system operation.

As shown in FIG. 1, the method of sensor module operation includes: operating a stand-alone sensor module in a mid-power mode in response to determining a driving state predictive of a driving event (e.g., prediction of a first trigger event); operating the sensor module in a high-power mode in response to occurrence of the first trigger event (e.g., receipt of a first trigger); and operating the sensor module in a low-power mode in response to occurrence of a second trigger event. The method can optionally include operating the sensor module in the mid-power mode in response to determining a second driving state predictive of a second driving event (e.g., prediction of the second trigger event). The method functions to conserve sensor module energy and/or manage sensor module power consumption by selectively powering the sensor module based on driving context.

Figure 8:
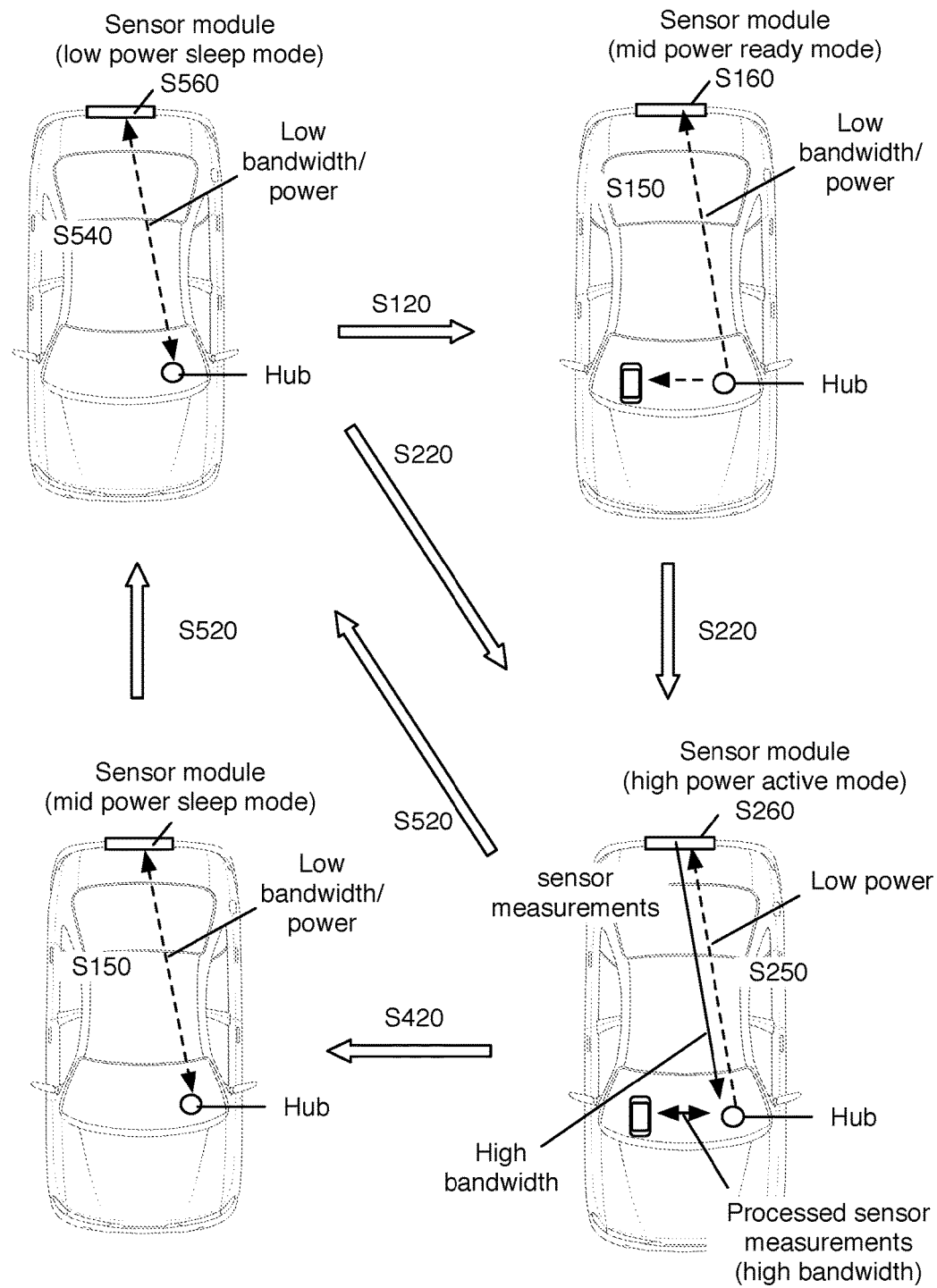
FIG. 8 is a schematic representation of a second specific example of sensor system operation between the low-power sleep mode, mid-power ready mode, and high-power active mode.

In a specific example as shown in FIG. 8, the method includes: determining a driving state predictive of a reverse event with a hub electrically connected to a vehicle power system; operating a sensor module mounted to the vehicle (e.g., backup sensor module mounted to the rear of the vehicle) in a ready mode in response to reverse event prediction, including powering sensors of the sensor module (e.g., wherein the hub instructs the sensor module to operate in the ready mode); detecting occurrence of the reverse event with the hub; operating the backup sensor module in an active mode in response to detection of the reverse event (e.g., wherein the hub instructs the sensor module to operate in the active mode), including sampling measurements with the sensors and sending measurements to the hub; predicting a sleep event at the hub, wherein sleep event prediction can include detecting a drive event; operating the backup sensor module in a ready mode in response to drive event prediction (e.g., wherein the hub instructs the sensor module to operate in the ready mode); detecting occurrence of the sleep event at the hub; and operating the sensor module in a sleep mode in response to sleep event detection, including shutting off power to the sensors and powering a low-energy communication module that is wirelessly connected to the hub (e.g., wherein the hub instructs the sensor module to operate in the sleep mode). This method functions to selectively power the backup sensor module when the backup sensor module will be needed, and to automatically operate the backup sensor module in a low-power state when it is not needed.

2. Benefits.

The inventors have discovered that vehicles are long-lived consumer goods, and is a field in which the consumer replacement rate lags far behind the rate of innovation. Furthermore, even though consumers (e.g., families) concurrently own multiple vehicles, they tend to only replace one vehicle at a time. This leads to consumers owning a varied population of vehicles with a mix of capabilities. The consumers become accustomed to the capabilities of the newer vehicles, and want the new capabilities on their older vehicles.

However, there is no easy way of incorporating new sensors into old vehicles, particularly sensors that measure the environment external the vehicle (e.g., backup cameras). In particular, sensor incorporation into older vehicles is limited by how power is supplied to the external sensor. Conventionally, sensor retrofits either: plug into the vehicle power system through an existing vehicle port (e.g., a diagnostic port); or are wired directly into the vehicle power system. The former retrofit suffers from poor sensor positioning, as the existing vehicle ports tend to be located within the vehicle interior. The latter retrofit suffers from wiring complexity, as the vehicle must be at least partially deconstructed to tap into the vehicle power system. The latter retrofit also raises a large barrier to consumer adoption because it is expensive, difficult, and aesthetically displeasing.

To address these issues, the inventors have created a system and method of retrofitting a vehicle with external sensors. In particular, the inventors have created a selfpowered sensor module that is powered by a vehicle-independent power source (e.g., a battery). However, because the vehicle-independent power source is not connected to a substantially constant power source (e.g., the vehicle power system), it has limited power available for sensor module operation. This problem is compounded when the sensor module includes components having high power requirements, such as high-resolution cameras, processors, and/or communication modules (e.g., WiFi modules), any of which could easily consume all available power stored by the independent power source.

The inventors have resolved this power provision issue by selectively operating the sensor module between a set of power states. However, this creates yet another problem: the components required to detect and interpret the switching events are not operable when the sensor module is in a low-power state. The inventors have resolved this issue by including a control center, physically connected to the vehicle power system and wirelessly connected to the remote sensor module, that monitors and triggers sensor module mode changes when needed.

The system can additionally facilitate better user experiences over conventional systems. First, the system can minimize sensor module startup lag by predicting when the sensor module will be needed with the control center, and anticipatorily placing sensor module components in a ready state (e.g., wherein the components are powered but not active, such that sensor module power consumption is reduced). Second, the sensor module can include an automatic recharging system (e.g., a solar recharging system) that minimizes the need for a user to manually recharge the independent power source. In this variation, the sensor module can additionally automatically control itself to manage excess power provision by the recharging system (e.g., measured or predicted) to minimize user monitoring and/or extend the sensor module lifetime. Third, the system can minimize sensor module energy consumption during storage (e.g., at a manufacturer or retailer facility, during shipping such as to a customer, before installation on a vehicle, etc.) while enabling easy initial use by automatically preparing for user interaction (e.g., through a control center and/or user device) during user setup. For example, the sensor module can remain attached to a mounting bracket during storage, operate in a lower-power mode (e.g., sleep or standby mode) while in storage, and include a sensor to detect detachment from the mounting bracket. Upon detachment, the sensor module can begin operation in a higher power mode (e.g., monitor mode), powering a wireless communication module and thereby enabling wireless communication.

3. System.

Figure 5:
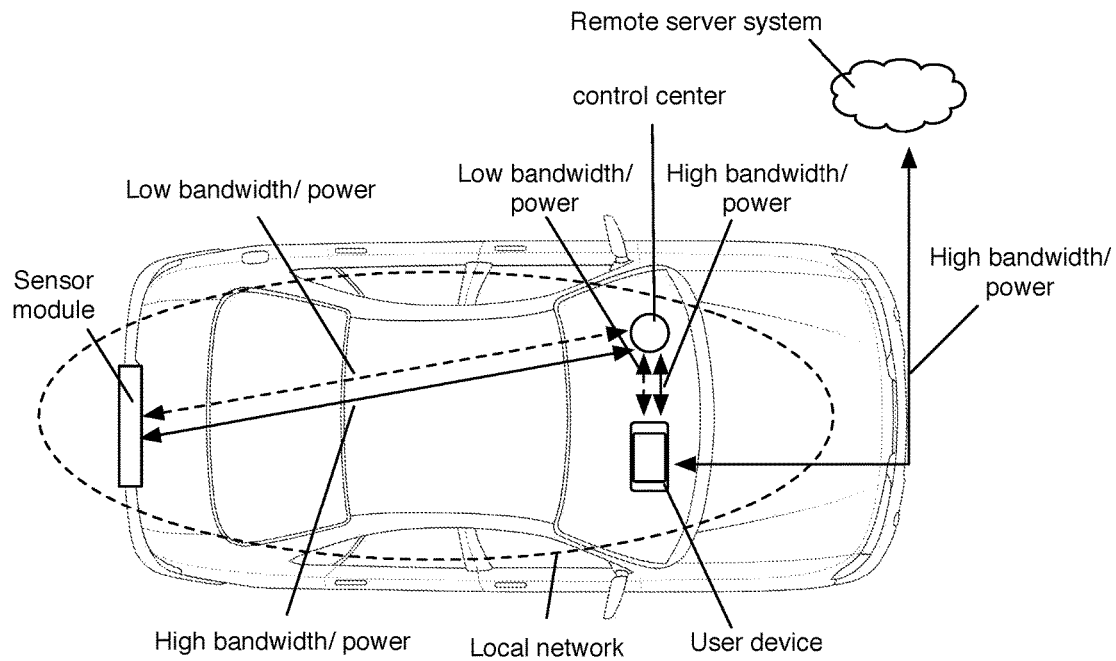
FIG. 5 is a schematic representation of different types of connections that can be established between a specific example of the sensor module, control center, and user device.

As shown in FIG. 5, this method can be performed using a set of on-board vehicle systems, including a sensor module, a hub, a user device, and/or built-in vehicle monitoring systems (e.g., odometers, wheel encoders, BMS, on-board computer, etc.), but can additionally or alternatively be used with a remote computing system (e.g., remote server system). On-board vehicle systems can be vehicle retrofit systems, built-in vehicle systems, portable systems temporarily located in the vehicle, and/or any other suitable vehicle systems. However, the method can be performed with any other set of computing systems.

Figures 3, 4:
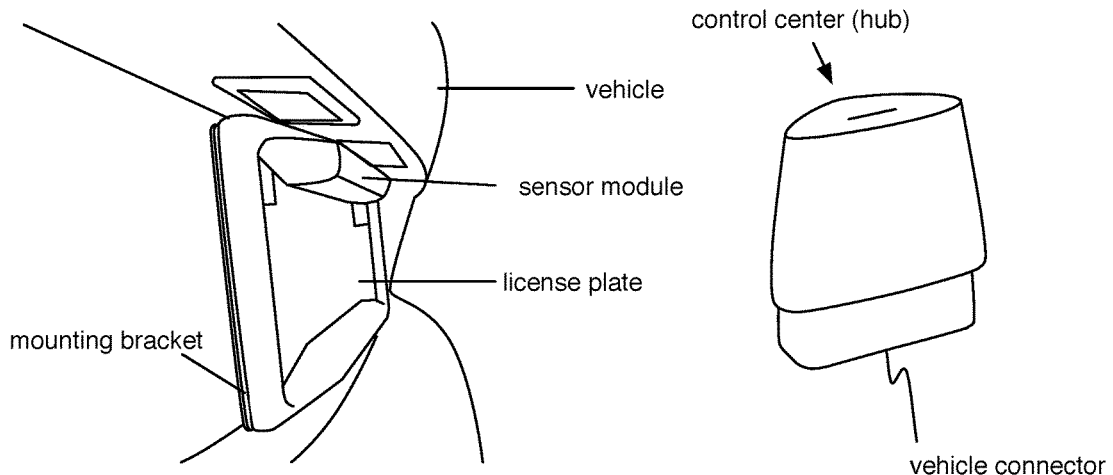
FIG. 3 is a perspective view of a variation of the sensor module mounted to a vehicle.
FIG. 4 is a perspective view of a variation of the control center.

The sensor module of the system functions to sample sensor measurements indicative of the vehicle environment and/or vehicle operation (example shown in FIG. 3). The sensor module is preferably configured to mount to the vehicle (e.g., vehicle exterior, vehicle interior), more preferably configured to be removably attachable to the vehicle (e.g., configured to removably attach to a mounting bracket attached to the vehicle license plate, configured to removably attach to a windshield of the vehicle, etc.; including a sensor to detect detachment from the vehicle, such as a hall effect sensor configured to detect proximity of a magnet in a mounting bracket), but can alternatively be otherwise arranged relative to the vehicle. In one example, the sensor module can sample images, video, and/or audio of a portion of the vehicle environment (e.g., behind the vehicle, in front of the vehicle, etc.). In a second example, the sensor module can sample proximity measurements of a portion of the vehicle (e.g., blind spot detection, using RF systems). The sensor module can include a set of sensors (e.g., one or more sensors), a processing module (processing unit), a communication module, and a power storage system. The sensor module can additionally include a recharging system configured to recharge the power storage system. However, the sensor module can include any other suitable component.

The sensor module is preferably operable between a plurality of operation modes. The sensor module is preferably operable between a low-power state and a high-power state, wherein all or most sensor module components are powered off or placed in a deep sleep state in the low-power state (e.g., powered off at all times, powered on intermittently with a low duty cycle, etc.), and powered on and active (e.g., sampling, processing, transmitting, receiving, etc.) in the high powered state. The sensor module can additionally be operable in a mid-power state (e.g., a state wherein all or most sensor module components are powered but inactive), and/or in a standby state, wherein the sensor module consumes less power than when operating in the low-power state (e.g., fewer components powered on than in the low-power state, powering components at a lower duty cycle than in the low-power state, etc.). The recharging system is preferably operational throughout all power states, but can alternatively be powered off in the low-power state, high-power state, mid-power state, standby state, or in any other suitable state or combination thereof. However, the sensor module components can be otherwise powered and/or controlled in each power state.

In one variation, the sensor module is operable between an active mode, a ready mode, a monitor mode, and a sleep mode. In the active mode (e.g., high-power state), the sensors of the module sample measurements (e.g., the cameras sample video, proximity sensors emit signals and sample reflected signals, temperature sensors sample ambient temperature, etc.) at a predetermined frequency (e.g., determined based on the driving context, fixed at a sampling rate, etc.), and the high-bandwidth communication module transmits the sampled measurements over a high-bandwidth connection (e.g., streams the sampled video). The geolocation system and/or any other suitable system can additionally be fully operational (e.g., to determine the sensor module physical location). A low-power, low-bandwidth communication channel with an external endpoint (e.g., the hub or user device) can additionally be maintained, wherein the low-bandwidth connection can additionally be operated to send and/or receive sensor module operation instructions, operation parameters, security credentials, metadata, or any other suitable data concurrently or asynchronously with the sensor stream.

In the ready mode (e.g., mid-power state), high-power sensors can be powered but not operated (e.g., not sampling video), low-power sensors can be operated (e.g., temperature sensors, light sensors, etc. can be operational), and the high-bandwidth communication module can be connected to an endpoint through a high-bandwidth connection but not transmit substantial amounts of information. The geolocation system and/or any other suitable system can additionally be powered, but non-operational. The low-bandwidth communication channel can additionally be maintained.

The monitor mode preferably functions to allow the sensor module to collect contextual information while conserving sensor module energy and/or reducing sensor module power consumption. In the monitor mode, the high-power sensors, high-power communication system, geolocation system, and/or any other suitable system may be shut off or placed in a deep sleep mode. Additionally or alternatively, the high-power sensors, high-power communication system, geolocation system, and/or any other suitable system may be powered on and/or operated some or all of the time (preferably, operated occasionally while remaining powered off most of the time). For example, while the sensor module is operating in the monitor mode, a camera of the sensor module may be turned on periodically or with any other suitable timing (e.g., regular intervals such as every 5 minutes, every hour, every day; based on current and/or projected energy availability; in response to sensor measurements such as sensor module accelerometer data indicating that the vehicle has been bumped; etc.) to sample a limited data set (e.g., a single image, 1 second of video, 1 frame per second for 10 seconds, etc.). Images captured by the camera while operating in the monitor mode can be transmitted to an endpoint (e.g., the control center) and can be analyzed to determine contextual information (e.g., vehicle location type, such as a parking lot or city street; nearby stationary obstacles; etc.). This image analysis is preferably performed at the control center and/or a remote computing system, but additionally or alternatively can be performed at the sensor module and/or any other suitable system. In the monitor mode, the low-power sensors can be powered and operated, and a mid-power communication module can be powered and connected to an endpoint (e.g., the hub), wherein the mid-power communication module can send the sensor measurements periodically or with any other suitable timing to the endpoint. For example, power system monitoring sensors (e.g., battery state of charge sensors, solar module generation sensors, power system temperature sensors, etc.) can sample power system data which can be stored in a log at the sensor module, and the log can be transmitted to an endpoint (e.g., the control center) periodically (e.g., once per hour, once per day, at a predetermined time of day, etc.), at times determined based on an energy availability state, or with any other suitable timing. A user profile can be updated based on the power system data, and notifications regarding the sensor module power system (e.g., notifications to charge the sensor module, parking recommendations to increase solar illumination on the solar module, etc.) can be provided to the user based on the updated user profile.

In the sleep mode, the sensors can be shut off or placed in a deep sleep mode, and a low-power communication module can be powered and connected to an endpoint (e.g., the hub), wherein the sensor module can receive operation mode adjustment commands from the endpoint via the low-power communication channel established by the low-power communication module. The geolocation system and/or any other suitable system is preferably shut off or placed in a deep sleep mode. However, the sensor module can be operated between any suitable set of modes specifying any suitable component power and/or operation state.

The sensor module can additionally be operable in a standby mode, wherein all components can be shut off or placed in deep sleep. The sensor module can automatically enter the standby mode in response to occurrence of a standby event trigger, or at any other suitable time. The standby event trigger can be the battery state of charge falling below a threshold value (e.g., 5% of total battery capacity), the anticipated battery state of charge falling below a threshold value, receipt of a standby instruction from the hub, or any other suitable event. The sensor module can automatically exit the standby mode in response to actual or anticipated power provision (e.g., receipt of power from an external power source or the energy harvesting system), in response to the battery state of charge exceeding a threshold value (e.g., based on the battery management system), in response to sensor module disconnection and/or reconnection with the vehicle (e.g., with a backplate, based on data sampled from a detachment sensor such as a hall effect sensor), or upon occurrence of any other suitable exit event.

The set of sensors function to sample measurements indicative of the vehicle environment. Examples of sensors that can be included in the set of sensors include: cameras (e.g., stereoscopic cameras, multispectral cameras, hyperspectral cameras, etc.) with one or more lenses (e.g., fisheye lens, wide angle lens, etc.), temperature sensors, pressure sensors, proximity sensors (e.g., RF transceivers, radar transceivers, ultrasonic transceivers, etc.), light sensors, audio sensors (e.g., microphones), accelerometers, gyroscopes, IMUs, or any other suitable set of sensors. The sensor module can additionally include a signal emitter that functions to emit signals measured by the sensors (e.g., when an external signal source is insufficient). Examples of signal emitters include light emitters (e.g., lighting elements), such as white lights, IR lights, RF, radar, or ultrasound emitters, audio emitters (e.g., speakers), or include any other suitable set of emitters.

The processing module of the sensor module preferably functions to process the sensor measurements, control sensor module operation (e.g., control sensor module operation state or mode, power consumption, etc.), and/or perform any other suitable process. The processing module can be a microprocessor, CPU, GPU, or any other suitable processing unit. The processing module can include multiple processing units (e.g., a high-power processor used only in higher-power modes and a low-power processor used in lower-power modes, and optionally used in higher-power modes as well; a sensor processor used to manage and/or process data from some or all sensor module sensors, and a primary processor used for processing tasks not handled by the sensor processor; etc.). The processing module can additionally or alternatively include storage to store, cache, or otherwise retain sensor data, settings, or any other suitable information. However, such processing can additionally or alternatively be performed by a hub, user device, remote computing system, and/or any other suitable processing system.

The communication module functions to communicate information, such as the raw and/or processed sensor measurements, to an endpoint. The communication module can be a single radio system, multiradio system, or support any suitable number of protocols. The communication module can be a transceiver, transmitter, receiver, or be any other suitable communication module. Examples of communication module protocols include short-range communication protocols, such as BLE, Bluetooth, NFC, ANT+, UWB, IR, and RF, long-range communication protocols, such as WiFi, Zigbee, Z-wave, and cellular, or support any other suitable communication protocol. In one variation, the sensor module can support one or more low-power protocols (e.g., BLE and Bluetooth), and support a single high- to mid-power protocol (e.g., WiFi). In an example of this variation, the sensor module has a low-power communication module (e.g., low-power radio) that supports the one or more low-power protocols (e.g., Bluetooth radio) and a high- to mid-power communication module (e.g., high- to mid-power radio) that supports the high- to mid-power protocol (e.g., WiFi radio). However, the sensor module can support any suitable number of protocols and can have any suitable number and type or types of radios, and each radio and/or other communication module component can be independently operable in multiple power modes.

In one variation, the sensor module can additionally include an on-board power storage system (e.g., battery), and function independently from the vehicle. This variation can be particularly conducive to aftermarket applications (e.g., vehicle retrofitting), in which the sensor module can be mounted to the vehicle (e.g., removably or substantially permanently), but not rely on vehicle power or data channels for operation. However, the sensor module can be wired to the vehicle, or be connected to the vehicle in any other suitable manner. The power storage system can be a secondary battery (e.g., rechargeable battery of lithium chemistry, nickel cadmium chemistry, etc.), a fuel cell coupled to a fuel source, or be any other suitable power storage system. The power storage system can additionally include a battery management system connected to the battery that functions to monitor and/or adjust battery operation.

The power system of the sensor module can additionally include a recharging system that functions to harvest energy from the vehicle environment and/or recharge the power storage system. The recharging system is preferably electrically connected to the power storage system, but can be wirelessly connected (e.g., inductively connected) or otherwise connected to the power storage system. The recharging system can be removably connected to the power storage system (e.g., connected by a switch, such that the recharging system can be selectively disconnected from the power storage system), substantially permanently connected, or otherwise connected. The recharging system can be a solar power system, a wind harvesting system, a vibration harvesting system (e.g., a piezoelectric conversion system), a rotatory energy harvesting system (e.g., configured to harvest energy from a wheel), or be any other suitable energy conversion system. Alternatively or additionally, the recharging system can be a secondary power source, such as a secondary battery, a fuel cell system, or be any other suitable recharging system. The recharging system can be mounted on the sensor module, mounted distal the sensor module (e.g., to a portion of the vehicle), or supported on any other suitable surface. The recharging system can additionally or alternatively include a recharging cable or connector configured to electrically connect to an external power source, or include any other suitable energy provision system. The recharging connector can include a power and data connector, a power only connector, or any other suitable connector. Examples of the recharging connector include consumer standard connectors (e.g., USB, Lightning, etc.), induction coils, or any other suitable connector.

The hub of the system functions as a communication and processing hub for facilitating communication between the user device and sensor module (example shown in FIG. 4). The hub can include a vehicle connector, a processing module, and a communication module, but can alternatively or additionally include sensors (e.g., accelerometers, IMUs, microphones, etc.), outputs (e.g., speakers, lights, etc.), or any other suitable component.

The hub is preferably operable between a plurality of operation states. The hub can be operable between a low-power state and a high-power state, wherein all or most hub components are powered off or placed in a deep sleep state in the low-power state (e.g., powered off at all times, powered on intermittently with a low duty cycle, etc.), and powered on and active (e.g., sampling, processing, transmitting, receiving, etc.) in the high powered state. The hub can optionally be operable in a mid-power state (e.g., a state wherein all or most hub components are powered but inactive), and/or in a sleep state, wherein the hub consumes less power than when operating in the low-power state (e.g., fewer components powered on than in the low-power state, powering components at a lower duty cycle than in the low-power state, etc.). However, the hub components can be otherwise powered and/or controlled in each power state. In one variation, the hub is operable in a sleep state (e.g., in which the hub draws less than 5 mA), an idle state (e.g., in which the hub draws less than 18 mA), a ready state (e.g., in which the hub draws at least 20 mA more than in the idle state), and an active state (e.g., in which the hub draws significantly more current than in the idle state, such as 400 mA).

The vehicle connector of the hub functions to electrically (e.g., physically) connect to a monitoring port of the vehicle, such as to the OBD-II port, other CAN bus port, or other monitoring port. Alternatively, the hub can be a stand-alone system or be otherwise configured. More specifically, the vehicle connector can receive power from the vehicle and/or receive vehicle operation data from the vehicle. The vehicle connector is preferably a wired connector (e.g., physical connector, such as an OBD or OBD-II connector), but can alternatively be a wireless communication module. The vehicle connector is preferably a data- and power-connector, but can alternatively be data-only, power-only, or have any other configuration. When the hub is connected to a vehicle monitoring port, the hub can receive both vehicle operation data and power from the vehicle. Alternatively, the hub can only receive vehicle operation data from the vehicle (e.g., wherein the hub can include an on-board power source), only receive power from the vehicle, transmit data to the vehicle (e.g., operation instructions, etc.), or perform any other suitable function.

Figure 2:
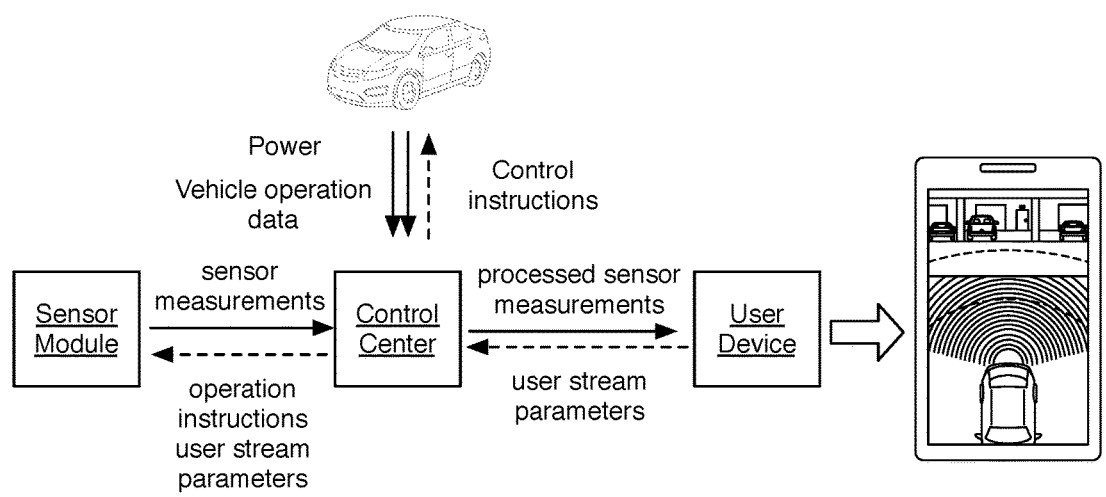
FIG. 2 is a schematic representation of a specific example of data transmitted between system components.

The processing module of the hub functions to manage communication between the system components. The processing module can additionally function to detect an imminent driving event and/or generate a notification in response to imminent driving event determination. The processing module can additionally function as a processing hub that performs all or most of the resource-intensive processing in the method. For example, the processing module can: route sensor measurements from the sensor module to the user device, process the sensor measurements to extract data of interest, generate user interface elements (e.g., warning graphics, notifications, etc.), control user interface display on the user device, or perform any other suitable functionality. The processing module can additionally generate control instructions for the sensor module and/or user device (e.g., based on user inputs received at the user device, vehicle operation data, sensor measurements, external data received from a remote system directly or through the user device, etc.), and send or control the respective system according to control instructions (example shown in FIG. 2). Examples of control instructions include power state instructions, operation mode instructions, vehicle operation instructions, or any other suitable set of instructions. The processing module can be a microprocessor, CPU, GPU, or any other suitable processing unit. The processing module can include multiple processing units (e.g., a high-power processor used only in higher-power modes and a low-power processor used in lower-power modes, and optionally used in higher-power modes as well; a sensor processor used to manage and/or process data from some or all hub sensors, and a primary processor used for processing tasks not handled by the sensor processor; etc.). The processing module is preferably powered from the vehicle connector, but can alternatively or additionally be powered by an on-board power system (e.g., battery) or be otherwise powered.

The communication system of the hub functions to communicate with the sensor module and/or user device. The communication system can additionally or alternatively communicate with a remote processing module (e.g., remote server system). The communication system can additionally function as a router or hotspot for one or more protocols, and generate one or more local networks. The communication module can be a single radio system, multiradio system, or support any suitable number of protocols. The communication module can be a transceiver, transmitter, receiver, or be any other suitable communication module. Examples of communication module protocols include short-range communication protocols, such as BLE, Bluetooth, NFC, ANT+, UWB, IR, and RF, long-range communication protocols, such as WiFi, Zigbee, Z-wave, and cellular, or support any other suitable communication protocol. One or more communication protocols can be shared between the sensor module and the hub. Alternatively, the hub can include any suitable set of communication protocols. In one variation, the communication system of the hub can be pre-paired with the communication system of a corresponding sensor module (e.g., at the manufacturer site, by the device user, automatically upon recognition of a sensor module). For example, a hub and sensor module can be bundled together at the manufacturer site, with the bundled hub and sensor module pre-paired such that the hub serves as the master device and the sensor module as a slave device.

The user device of the system functions to display the processed sensor measurements to the user. The user device can additionally function as a user input to the system, function as a user identifier, function as a user proximity indicator, function as a remote computing system communication channel, or perform any other suitable functionality. The user device preferably runs an application (e.g., web-based application or native application), wherein the application associates the user device with a user account (e.g., through a login) and connects the user device to the hub and/or sensor module, but can alternatively connect to the hub and/or sensor module in any other suitable manner. The user device can include: a display or other user output, a user input (e.g., a touchscreen, microphone, or camera), a processing module (e.g., CPU, microprocessor, etc.), a communication system (e.g., WiFi, BLE, Bluetooth, etc.), or any other suitable component. Examples of user devices include smartphones, tablets, laptops, smartwatches (e.g., wearables), vehicle navigation and/or media systems, or any other suitable user device.

4. Method.
4.1 Sensor Module Operation in the Mid-Power Mode.

Operating a stand-alone sensor module in a mid-power mode S100 in response to determining a driving state predictive of a driving event S120 functions to ready sensor module components for use while conserving sensor module energy and/or minimizing sensor module power consumption. Operating the sensor module in the mid-power mode S100 can include operating the sensor module components in a mid-power mode S160. However, the sensor module can be otherwise operated in the mid-power mode.

Determining a driving state predictive of a driving event S120 functions to identify imminent sensor module use. The driving state can be a vehicle state (e.g., vehicle ignition state, vehicle transmission state, vehicle velocity, vehicle acceleration, vehicle steering angle, vehicle location, etc.), a user state (e.g., predicted user identity, user proximity to a vehicle, user voice command utterance, etc.), a user device state (e.g., user device position, user device velocity, user device application status, recent user device communications, user interaction with the user device, etc.), a temporal state (e.g., a time of day, a day of the week, a date, an amount of time before sunset, etc.), or any other suitable state. Determining the driving state S120 can be based on sensor data (e.g., proximity sensor data, camera data, audio sensor data, etc.), sensor system status data (e.g., battery state of charge, energy harvester production, wireless system connections, etc.), historical data (e.g., data associated with operation of the vehicle, data associated with occurrence times of vehicle operation events, data associated with a transmission state during a previous driving session, etc.), and/or any other suitable data. A driving session can be defined by or determined based on engine status, transmission status, vehicle door status, user device status, and/or any other suitable factors, and is preferably a continuous time interval (e.g., a time interval during which the engine remains in an on state, the transmission is not in a park state, the driver door remains closed, etc.), but can alternatively be otherwise determined. The data used to determine the driving state can be collected or sampled by the sensor module; the control center; the vehicle; the user device; a remote server; a second vehicle, user device, and/or vehicle sensor system; and/or any other suitable component. For example, the sensor system can include a control center with an accelerometer, and determining the driving state S120 can be based on data sampled by the accelerometer.

In one variation of Block S120, the driving state can be user presence. In a first example of this variation, the driving state can be determined when a hub and/or sensor module accelerometer and/or microphone provides signals indicative of user presence (e.g., car door slam, user's voice above a certain acoustic level, etc.). In a second example of this variation, the driving state can be determined when a user presence is detected (e.g., when the user device connects to the hub or vehicle, etc.). In a second variation, the driving state can be the vehicle power being turned on, and can be determined when the vehicle power-on state is detected (e.g., based on the power supplied to and/or on the vehicle bus). In a third variation, the driving state can be a vehicle location and a time of day indicative of imminent vehicle usage. In an example of this variation, the vehicle location can be determined by a previous user device location (e.g., GPS reading, WiFi positioning reading, etc.) sampled during the most recent connection of the user device to the sensor system wireless network, combined with indications sampled by the sensor system (e.g., accelerometer readings, vehicle CAN bus readings, etc.) indicating that the vehicle has not been driven or has been driven no more than a short distance (e.g., 1 meter, 10 meters, 50 meters, etc.) in the time after the user device location sampling. In this example, the vehicle location can be a home or work location (e.g., based on a user profile, determined from a historical data set, etc.), and the time of day can precede a likely driving event (e.g., based on historical driving events occurring at the vehicle location, based on a driver calendar, etc.) by a predetermined interval (e.g., 5 seconds, 20 seconds, 1 minute, etc.). However, the driving state can be any other suitable state, and can be determined in any other suitable manner.

Determining a driving state predictive of a driving event S120 preferably includes predicting the driving event based on the driving state, but additionally or alternatively can include predicting any other suitable event based on the driving state, or making any other suitable prediction. Alternately, S120 can include no driving event prediction. The driving event is preferably predicted by the control center (e.g., the hub), but can alternatively be predicted by the sensor module, a remote computing system, or any other suitable computing system, wherein the indicative data can be transmitted to the computing system from the control center and/or sampling devices. The driving event is preferably predicted while the sensor module is in a low-power state (e.g., a sleep state, a monitor state, a standby state, etc.) but can alternatively be predicted while the sensor module is in a mid-power state, a high-power state, or any other suitable state. However, the driving event can alternatively be predicted by the sensor module (e.g., by low-power sensors and/or processors operating in the low-power mode), a user device connected to the sensor module (e.g., wirelessly connected to the sensor module), or by any other suitable system. The driving event can be predicted before the vehicle power system is turned on; after the vehicle power system is turned on; before the vehicle ignition is turned on; after the vehicle ignition is turned on; or be predicted at any other suitable time relative to vehicle operation.

Figure 6:
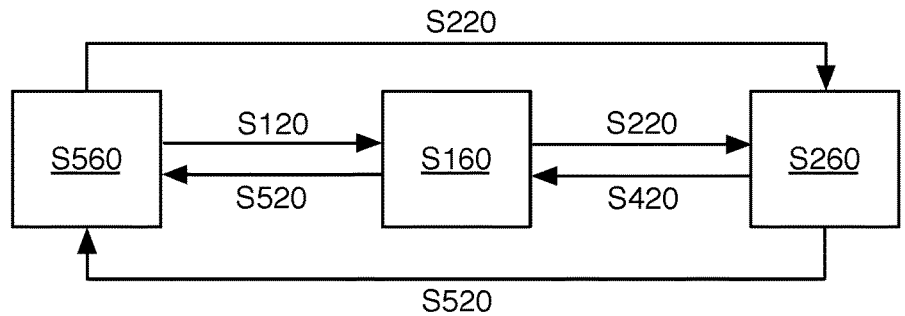
FIG. 6 is a schematic representation of an example of the method.
Figure 9:
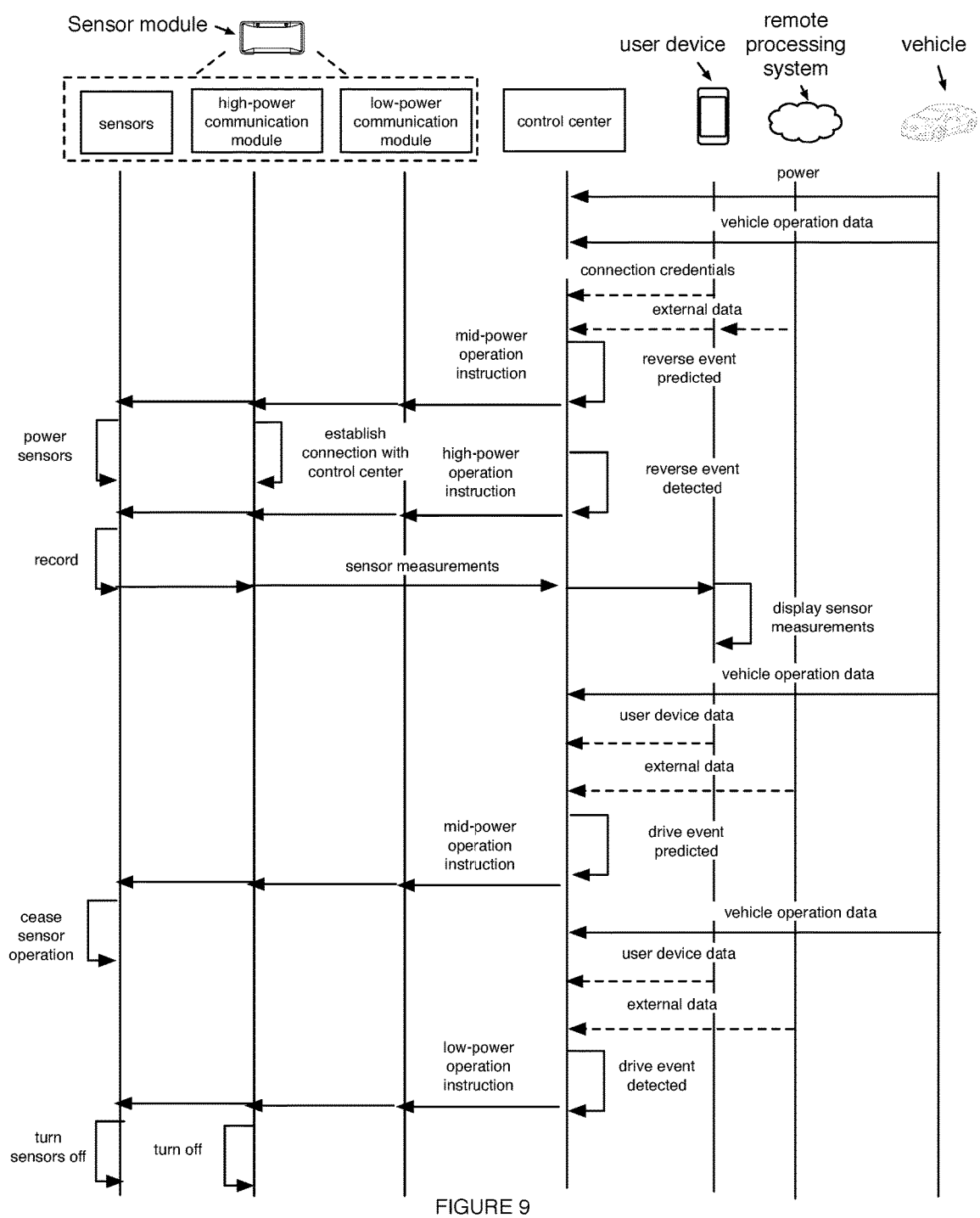
FIG. 9 is a schematic representation of a third specific example of the method.

The driving event is preferably a reverse event (examples shown in FIG. 6 and FIG. 9), but can alternatively be a drive event (e.g., forward event, turn event, stop event, lane change event, etc.), a vehicle state change event (e.g., gear change, ignition change, door opening and/or closing, passenger embarking and/or disembarking, etc.) or be any other suitable vehicle event. The driving event can be predicted based on one or more factor values. Factors that can be considered include: vehicle operation parameters, user device sensor measurements, vehicle sensor measurements, hub measurements, auxiliary system output (e.g., outputs from third party products), user profiles, vehicle profiles, user device proximity to the system (e.g., to the hub), historic vehicle operation parameters (e.g., the last gear that the vehicle transmission was in before parking), historic sensor measurements (e.g., the last direction that the vehicle was moving before stopping, relative to the sensor module field of view), vehicle bus state (e.g., as determined using the voltage supplied to a comparator electrically connected to the vehicle bus), the sensor module power source state of charge, or factors based on any other suitable set of parameters. However, the driving event can be any other suitable event, and can be predicted based on any other suitable basis.

The driving event can be predicted directly, indirectly, or in any other suitable manner. Direct driving event prediction can include detecting the occurrence of one or more factor values. For example, direct driving event prediction can include detecting vehicle ignition. Indirect driving event prediction can include operating the sensor module in the mid-power mode when a threshold probability (e.g., a predetermined threshold probability, a threshold probability calculated based on current and/or historical data, etc.) is less than the probability of the driving event occurring (e.g., determined by calculating the probability based on a set of factor values, determined by estimating that the probability exceeds the threshold probability, etc.); calculating a score for the driving event occurring based on a set of factor values and operating the sensor module in the mid-power mode when the score exceeds a threshold score; or otherwise indirectly predicting driving event occurrence. In one variation of indirect driving event prediction, the threshold probability can be determined based on an energy availability state (e.g., an energy availability state based on the state of charge of the battery, based on a historical data set associated with operation of the vehicle, based on weather forecast data, based on a user indication, etc.). However, the driving event can be otherwise predicted.

The driving event can be predicted probabilistically (e.g., wherein the probability of a reverse event occurring is determined, given combination of factor values), deterministically (e.g., wherein a reverse event is about to occur when a given combination of factor values occurs and/or a reverse event score, calculated using the factor values, meets a score threshold), or determined in any other suitable manner. The factor combinations to be considered, probability determination algorithms, score calculation algorithms, factor weights, and/or any other suitable prediction variable can be received from a user, learned and iteratively updated (e.g., using machine learning techniques), or otherwise determined.

In one variation, the method includes: predicting the driving event using a set of prediction algorithms; operating the sensor module in the mid-power mode based on the driving event prediction; after the driving event prediction, determining whether the driving event occurred based on factor values; and updating the set of prediction algorithms based on whether the driving event occurred. Updating the set of prediction algorithms can include: retraining the prediction algorithms based on the actual driving event (e.g., whether the driving event actually occurred, the parameters of the actual driving event, etc.), recalculating a set of algorithm constants or weights, adjusting the factors considered in the prediction, identifying or adjusting variable correlations, or otherwise updating the algorithms. In a second variation, the method includes: sampling a set of factor values during a pre-trigger time period; detecting occurrence of a direct predictor of the driving event at a trigger time after the pre-trigger time period (e.g., wherein the prediction algorithms do not indirectly predict the driving event prior to direct predictor occurrence); operating the sensor module in the mid-power mode based on occurrence of the direct predictor; and refining the prediction algorithms based on the set of factor values sampled during the pre-trigger period.

In a first example, a reverse event is predicted when: a first user device is connected to a communication network (e.g., a WiFi network) generated by the control center (e.g., the user device is proximal the vehicle), the user device sensor measurements indicate that the user device is at rest (e.g., based on accelerometer measurements), the vehicle is on (e.g., as determined from signals received by the control center from the diagnostic port), and a threshold time period after the vehicle was turned on has passed, wherein the threshold time period is specified by or otherwise determined from a user driving profile. In a second example, a reverse event is predicted when: the vehicle is on and the last gear propelling the vehicle (in the last driving session) was a forward gear. However, the reverse event can be predicted in any other suitable manner.

Operating the sensor module components in a mid-power mode S160 functions to place the components in a powered but less-than-fully-operating state. Operating the sensor module components in the mid-power mode S160 can include operating the wireless communication module in a mid-power communication mode and operating the sensor in a mid-power sensor mode. The components are preferably powered by the independent power storage system (e.g., the battery), but can alternatively be powered by excess power generated by the recharging system (e.g., power generated by the recharging system in excess of what can be stored in the power storage system), be powered by power generated by the recharging system, or be otherwise powered. In one variation, in which the wireless communication module includes a low-power radio and a high-power radio, operating the wireless communication module in the mid-power communication mode includes establishing a wireless connection using the high-power radio. A first example of this variation, in which the sensor system includes a control center attached to the vehicle, includes: establishing a high-throughput wireless connection between the wireless communication module and the control center using the high-power radio, and receiving an operation instruction (e.g., a high-power operation instruction to operate the sensor module in a high-power mode) from the control center using the low-power radio. A second example of this variation includes establishing a high-throughput wireless connection between the wireless communication module and a user device using the high-power radio. A variation of operating the sensor in a mid-power sensor mode includes powering the sensor but not sampling data with the sensor. However, operating the sensor module components in the mid-power mode S160, operating the wireless communication module in the mid-power communication mode, and operating the sensor in the mid-power sensor mode can include any other suitable operations.

Operating the stand-alone sensor module in the mid-power mode S100 optionally includes generating a mid-power operation instruction S140 and transmitting the mid-power operation instruction to the sensor module S150. S140 and/or S150 are preferably performed in response to performance of S120 (e.g., in response to driving event prediction), but additionally or alternatively can be performed in response to any other suitable event or at any other suitable time. S140 and S150 can be performed by the control center (e.g., hub, remote computing system, user device, etc.), be performed by the sensor module, or be otherwise performed. In embodiments that include transmitting the mid-power operation instruction to the sensor module S150, operating the sensor module components in a mid-power mode S160 is preferably performed in response to receipt of the mid-power operation instruction, but additionally or alternatively can be performed in response to any other suitable event or at any other suitable time.

The mid-power operation instructions are preferably generated by the control center, but can alternatively be generated by any other suitable component of the sensor system, by the user device, or by any other suitable device. The mid-power operation instructions are preferably transmitted over a low-power communication channel (e.g., BLE, Bluetooth, IR, RF, etc.), but can alternatively be transmitted over any other suitable communication channel. The mid-power operation instructions can be directly transmitted from the control center to the sensor module over a low-power communication channel shared between the control center and sensor module. Alternatively, the operation instructions can be indirectly transmitted from the control center, through the user device, to the sensor module, wherein the operation instructions can be communicated over a high-, mid-, or low-power communication channel from the control center to the user device and communicated from the user device to the sensor module over a low-power communication channel shared between the user device and the sensor module. The mid-power component instructions preferably specify the operation state for each component, but can alternatively specify the target sensor module operation mode, or include any other suitable set of instructions. The mid-power component instructions are preferably stored by the sensor module in association with the mid-power operation mode, but can alternatively be stored by the control center and/or user device (e.g., wherein the mid-power operation instructions can include the mid-power component instructions), a remote server system (e.g., wherein the mid-power component instructions are retrieved from the server), or stored by any other suitable system.

4.2 Sensor Module Operation in the High-Power Mode.

Operating the sensor module in a high-power mode S200, functions to confer new capabilities upon the old vehicle. S200 is preferably performed in response to receiving a trigger S220 (e.g., detecting an occurrence of a trigger event), but can alternatively be performed at any other suitable time. A trigger can be: a signal (e.g., received from a vehicle, control center, sensor module, user device, etc.), a detection event (e.g., sensor reading, connection to a device, wireless connection strength falling below a threshold value), vehicle operation event (e.g., reversing event, gear change event, ignition event, etc.), prediction (e.g., vehicle operation prediction, sensor module energy availability state prediction, etc.), or any other suitable trigger. In one example, operating a backup sensor module in the high-power mode functions to stream video of a physical region behind the vehicle (e.g., a region perpendicular to the vehicle longitudinal axis, opposing the steering wheel) to a display, such as a user device or vehicle screen. Operating the sensor module in the high-power mode S200 can include operating the sensor module components in the high-power mode S260, but can alternatively or additionally include any other suitable process.

Receiving the trigger S220 functions to indicate when the sensor module should be fully operated. Similar to driving event prediction, reception of the trigger S220 can be determined based on one or more factor values; can be detected directly, indirectly, or determined in any other suitable manner; be detected probabilistically or deterministically; or be otherwise determined. The trigger can be received S220 from the vehicle, from the control center, the sensor module, or any other suitable component of the vehicle sensor system, from a user device, or from any other suitable device. The trigger can be received S220 at the vehicle, at the control center, the sensor module, or any other suitable component of the vehicle sensor system, at a user device, or at any other suitable device.

Figure 7:
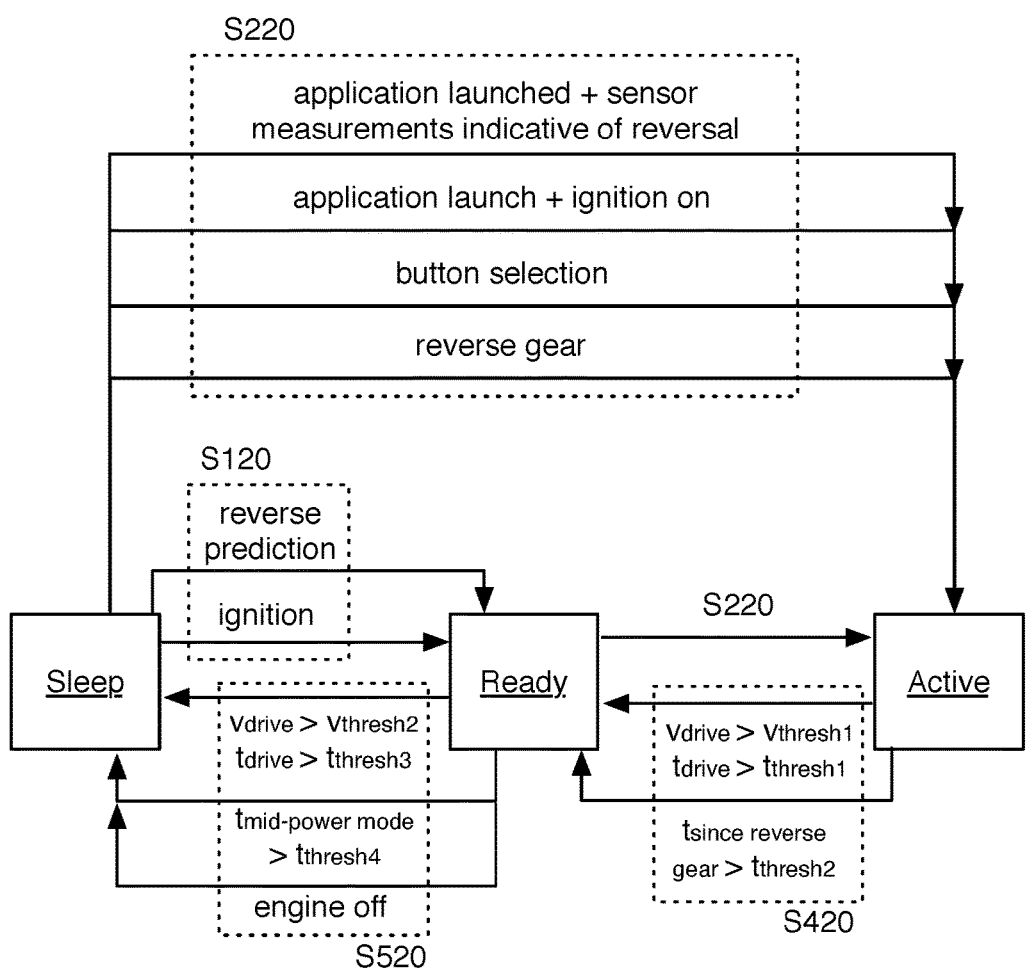
FIG. 7 is a schematic representation of a first specific example of the method.

In a first variation, the trigger is an indication that the vehicle is in a reverse gear, and the trigger is received S220 when the reverse gear is selected (e.g., based on vehicle operation data received by the control center through the diagnostic port of the vehicle), example shown in FIG. 7. In a second variation, the trigger is received S220 from the user device when a button (virtual or physical) displayed by or linked to a native application, associated with the sensor module and executed on the user device, is selected or depressed, example shown in FIG. 7. In a third variation, the trigger is received S220 when the native application is launched on a user device in close proximity to the vehicle and the engine is ignited (e.g., the engine is on, the ignition is on), example shown in FIG. 7. In a fourth variation, the trigger is received S220 when the sensors (e.g., accelerometer, gyroscope, compass, etc.) of the user device sample measurements indicative of vehicle reversal. Alternatively, the trigger can be received S220 in the fourth variation when the application is additionally in the foreground of the user device. In a fifth variation, the trigger is received S220 when objects are moving relative to the sensor module camera's field of view. In a sixth variation, the trigger is an indication that the vehicle has been turned on, and the trigger is received S220 at the control center (e.g., received from the vehicle through the diagnostic port of the vehicle, automatically determined upon power receipt at the hub). However, the trigger can be otherwise received.

Operating the sensor module in the high-power mode S200 functions to operate the sensor module according to its full capabilities. Operating the sensor module in the high-power mode S200 preferably includes switching sensor module operation from the mid-power mode to the high-power mode, but can alternatively include switching sensor module operation from the low-power mode to the high-power mode (e.g., skipping the mid-power mode) or otherwise transitioning the sensor module to operation in the high-power mode. Similar to operating the sensor module in the mid-power mode S100, operating the sensor module in the high-power mode S200 can include: generating a high-power operation instruction S240 in response to receiving the trigger S220, transmitting the high-power operation instruction to the sensor module S250, and operating the sensor module components in a high-power mode S260, preferably according to high-power component instructions in response to receipt of the high-power operation instruction. However, the sensor module can be otherwise operated in the high-power mode. Power for the sensor module components operating in the high-power mode is preferably supplied by the power storage system and augmented with excess power from the recharging system, but can alternatively be supplied by only the power storage system, only the recharging system, or by any other suitable power supply. Operating the sensor module components in a high-power mode S260 can include operating the wireless communication module in a high-power communication mode and operating the sensor or sensors in a high-power sensor mode. Operating the sensors in a high-power sensor mode preferably includes sampling a data set (e.g., operating a camera to sample an image data set, operating an audio sensor to sample an audio data set, operating an accelerometer to sample an acceleration data set, etc.). For example, operating the sensors in a high-power sensor mode can include operating a camera in a high-power camera mode including sampling an image data set.

Operating the wireless communication module in the high-power communication mode can include operating the wireless communication module using a high-power communication method (e.g., operating the high-power radio, using a high-power communication protocol, etc.), preferably to transmit (e.g., to the control center, to a user device, to the vehicle, etc.) an information set based on the data set (e.g., the data set itself, a modified version of the data set, information calculated based on the data set, the data set combined with additional data, etc.). The high-power communication mode preferably includes transmitting data above a threshold data transfer rate (e.g., instantaneous data transfer rate, typical data transfer rate, maximum data transfer rate, average data transfer rate, etc.), but can include performance of any other suitable high-power consumption process. The threshold data transfer rate can be equal to or greater than a characteristic data transfer rate (e.g., maximum data transfer rate, average data transfer rate, typical data transfer rate, etc.) of another communication mode (e.g., low-power communication mode, mid-power communication mode, etc.) and/or of a wireless communication protocol (e.g., Bluetooth, BLE, NFC, WiFi, etc.). Additionally or alternatively, the threshold data transfer rate can be equal to or greater than a predetermined data transfer rate (e.g., 1 kb/s, 10 kb/s, 35 kb/s, 2.1 Mb/s, 3 Mb/s, 10 Mb/s, etc.) or range of rates (e.g., 10-50 kb/s, 0.5-5 Mb/s, 10-100 Mb/s, etc.). Operating the wireless communication module in the high-power communication mode can additionally include maintaining the low-power communication channel between the sensor module and an endpoint such as the control center or user device (e.g., continuing to operate the low-power radio). Even though this low-power communication channel may be redundant in the high-power operation mode, maintaining the low-power communication channel in the high-power operation mode can minimize power usage later on (e.g., by minimizing power consumed in searching for a paired device).

A first variation of operating the wireless communication module in the high-power communication mode includes using a high-power communication method to transmit data including the information set to an endpoint at a data transfer rate above a threshold data transfer rate, while maintaining communication with the endpoint (e.g., receiving occasional operation instructions from the endpoint, sending status updates to the endpoint, etc.) using a low-power communication method to transmit operation instructions such as commands. In a specific example of this variation, a WiFi connection between the wireless communication module and the control center is used to stream image data from the sensor module to the control center at an average data transfer rate greater than the maximum sustained data transfer rate for the BLE communication protocol, while operation instructions, including a command to operate the sensor module in a low-power mode, are sent from the control center to the wireless communication module using a BLE connection. A second variation of operating the wireless communication module in the high-power communication mode includes sending data including the information set, receiving commands, and possibly performing additional communication between the wireless communication module and an endpoint using a high-power radio, and maintaining a low-power connection between the wireless communication module and the endpoint using the low-power radio but not sending and/or receiving data or commands using the low-power connection. Alternatively, the low-power communication channel and/or any other low-power variant of a high-powered component can be powered off in the high-power mode.

Transmitting the information set from the sensor module is preferably performed concurrently with sampling the data set (e.g., transmitting data as it is sampled, such as streaming video; generating a first portion of the information set based on the first portion of the data set, then transmitting the first portion of the information set before or while capturing a second portion of the data set; etc.), but additionally or alternatively can be performed after sampling the data set, or at any other suitable time.

Operating the stand-alone sensor module in the high-power mode S200 optionally includes generating a high-power operation instruction S240 and transmitting the high-power operation instruction to the sensor module S250. S240 and/or S250 are preferably performed in response to performance of S220 (e.g., in response to driving event prediction), but additionally or alternatively can be performed in response to any other suitable event or at any other suitable time. In embodiments that include transmitting the high-power operation instruction to the sensor module S250, operating the sensor module components in a high-power mode S260 is preferably performed in response to receipt of the high-power operation instruction, but additionally or alternatively can be performed in response to any other suitable event or at any other suitable time.

Similar to the mid-power operation instructions, the high-power operation instructions are preferably generated by the control center, but can alternatively be generated by any other suitable component of the sensor system, by the user device, or by any other suitable device. The high-power operation instructions are preferably transmitted over a low-power communication channel (e.g., BLE, Bluetooth, IR, RF, etc.), but can alternatively be transmitted over any other suitable communication channel. The high-power operation instructions can be directly transmitted from the control center to the sensor module over a low-power communication channel shared between the control center and sensor module. Alternatively, the operation instructions can be indirectly transmitted from the control center, through the user device, to the sensor module, wherein the operation instructions can be communicated over a high-, mid-, or low-power communication channel from the control center to the user device and communicated from the user device to the sensor module over a low-power communication channel shared between the user device and the sensor module. The high-power component instructions preferably specify the operation state for each component, but can alternatively the target operation mode or specify any other suitable set of instructions. The high-power component instructions are preferably stored by the sensor module in association with the high-power operation mode, but can alternatively be stored by the control center and/or user device (e.g., wherein the high-power operation instructions can include the high-power component instructions), a remote server system (e.g., wherein the high-power component instructions are retrieved from the server), or stored by any other suitable system.

4.3 Transmission to the User Device.

The method can additionally include transmitting an information set based on the data set to a user device S300, which functions to deliver information determined by the vehicle sensor system to the user device. The information set can be the raw data set (e.g., the original data set), the processed data set (e.g., data set after modification, down-sampled data set, etc.), derivatory data (e.g., averages, scores calculated from one or more variable values, etc.), or any other suitable information associated with the data set sampled by the sensor module. The information set can additionally or alternatively include information (e.g., sensor data, derivatory sensor data, retrieved data, etc.) determined by the control center, external databases, or any other suitable information.

The information set is preferably transmitted to the user device from the sensor module, more preferably relayed through the control center, but additionally or alternatively can be transmitted from or relayed through the vehicle, a second user device, and/or any other suitable transmission or relay device. The information set is preferably transmitted wirelessly to the user device, but additionally or alternatively can be transmitted by a wired data connection or by any other suitable method. The user device is preferably within the vehicle (e.g., a phone, watch, or other device carried by a driver into the vehicle; a vehicle media and/or navigation system; etc.), but alternatively can be on the exterior of the vehicle, not co-located with the vehicle, or in any other suitable position relative to the vehicle. When the information set is not the raw data set, S300 can additionally include generating the information set based on the data set S320 and/or controlling the user device to provide information to the user S340. The information provided to the user is preferably information based on the information set, but additionally or alternatively can be any suitable information.

The information set can be generated based on the data set S320 at the sensor module, at a relay device through which the transmission is relayed, and/or at any other suitable component or combination of components. For example, transmitting the information set to the user device S300 at an origin device (e.g., the sensor module) can include transmitting the data set from the origin device to the relay device; based on the data set, generating the information set at the relay device; and transmitting the information set from the relay device to the user device.

Generating the information set based on the data set S320 and/or modifying the data set can include: removing a portion of the data set; determining a visual, auditory, or other user-perceptible representation of the data set; summarizing the data set; incorporating additional information from outside the data set; determining information based on the data set; and/or any other suitable processing, modification, generation, analysis, and/or summarization. For example, generating the information set, based on a data set that includes images and/or image data, can include: determining a model of the vehicle surroundings (e.g., based on image analysis, based on data from auxiliary sensors such as proximity sensors, based on information from an external source such as a remote server, etc.); determining an imminent driving event; determining a notification (e.g., visual, auditory, etc.) associated with an imminent driving event; selecting a subset of the images; altering all or a portion of one or more of the images; indicating (e.g., highlighting, outlining, labeling, etc.) regions of interest; generating new images (e.g., abstracted line drawing, image representing the vehicle and/or its surroundings, etc.) based on the data set; generating a verbal summary of the image content; or any other suitable image or video processing, modification, generation, analysis, and/or summarization. Altering images or image portions can include: cropping, extrapolating from (e.g., to generate information extending past the image field of view), geometrically manipulating (e.g., dewarping, skewing, reflecting, translating, etc.), sampling (e.g., frames, pixels, etc.), filtering (e.g., sharpening, saturating, recoloring, edge-finding, etc.), changing the resolution of (e.g., upscaling, downscaling), or altering in any other suitable manner.

The information set can be transmitted to the user device S300 continuously, piecewise, at regular intervals, sporadically, upon availability of data for transmission, or with any other suitable timing. In variations in which transmitting the information set to the user device S300 includes relaying the information set through a relay device, the information set can be relayed with substantially no delay (e.g., relayed directly, relayed as quickly as practical for the relay device, relayed after no more than a minimal delay, etc.), relayed after the relay device receives some or all of the transmission to the relay device (e.g., a threshold data amount, a threshold reception time, one or more information subsets such as images of an image set, one or more pieces of a piecewise transmission, etc.), relayed after a delay (e.g., after a predetermined delay time, upon satisfaction of relay criteria, etc.), or relayed at any other suitable time. The relay criteria can be based on wireless communication status (e.g., suitably high signal strength, suitably low noise, upon connection to the user device, when the sensor module, other sensor system component, user device, vehicle, and/or any other suitable component is not wirelessly transmitting), request receipt (e.g., from the user device, sensor module, vehicle, etc.), processing status (e.g., after generation of all or a portion of the information set based on the data set), operation mode, and/or any other suitable factor or factors.

In one embodiment, the information set is transmitted wirelessly from the sensor module to the user device. In this embodiment, the sensor module preferably transmits the information set to the user device S300 while operating the wireless communication module in the high-power communication mode, more preferably in response to receiving the trigger S220 and/or before returning the sensor module to operation in the mid-power mode S400 or operating the sensor module in a low-power mode S500. Additionally or alternatively, the sensor module can transmit the information set to the user device S300 while operating the wireless communication module in the mid-power communication mode, operating the wireless communication module in a low-power communication mode, or operating the wireless communication module in any other suitable communication mode.

In a first variation of this embodiment, the sensor module wirelessly transmits the data set to the control center, the control center generates the information set based on the data set, and the control center transmits the information set to the user device. In a specific example of this variation, the sensor is a camera and the data set is an image data set sampled by the camera in response to receiving a trigger S220. In this example, the sensor module modifies the data set by sampling, resizing, and stitching together a predetermined subset of pixels from each image, then, while operating the wireless communication module in the high-power communication mode, transmits the modified data set to the control center using a WiFi connection hosted by the control center. In this example, the control center then generates the information set from the data set by generating a virtual model of the vehicle and its surrounding, augmenting the images of the data set by adding, outside the frame of the original image, an abstracted line drawing of the vehicle and its surroundings based on the virtual model, and overlaying distance markings on the augmented images. Finally, in this example, the control center transmits the information set to the user device and controls the user device to display the information set, using the WiFi connection.

In a second variation of this embodiment, the sensor module wirelessly transmits the information set directly to the user device. In a first example of this variation, the sensor module generates the information set by overlaying a notification on a region of the images of the data set, then transmits the information set to the user device using a Bluetooth connection. In a second example of this variation, the sensor module transmits the data set to a control center using a wired data connection, then the control center generates an intermediate information set based on the data set and transmits the intermediate information set to the sensor module using the wired data connection. Finally, in this example, the sensor module generates the information set based on the intermediate information set and then transmits the information set to the user device using a WiFi connection hosted by the user device.

4.4 Sensor Module Return to the Mid-Power Mode.

The method can additionally include returning the sensor module to operation in the mid-power mode S400, which functions to return the sensor module to the mid-power mode (e.g., in case the first trigger event occurs again, in case a return to the high-power mode is required, etc.). S400 is preferably performed in response to determining a second driving state predictive of a second driving event S420 (e.g., predicting a second trigger event), but can alternatively be performed at any other suitable time. In one example, the sensor module is returned to the ready mode in response to the reverse event ending, wherein the sensor module can be quickly returned to the active mode if the reverse event is detected again (e.g., in the case of a multi-point turn). Returning the sensor module to operation in the mid-power mode S400 preferably includes: determining a second driving state predictive of a second driving event S420 and operating the sensor module components in the mid-power mode S460. Block S400 can alternatively or additionally include repeating Block S100, include repeating specific elements of Block S100, and/or include any other suitable process.

Determining a second driving state predictive of a second driving event S420 functions to predict when the sensor module functionalities will no longer be needed. The second driving event can be constant forward driving (e.g., longer than a threshold duration), be the probability of a reverse event falling below a percentage threshold, or be any other suitable event. Similar to first driving event prediction, the second driving event can be predicted based on one or more factor values; can be predicted directly, indirectly, or predicted in any other suitable manner; be predicted probabilistically or deterministically; or be otherwise predicted.

In a first variation, the second driving event is predicted when the vehicle has been operating in a forward gear for more than a threshold period of time (e.g., 3 seconds). In a second variation, the second driving event is predicted when the vehicle has been driving faster than a threshold speed (e.g., 5 miles per hour). In a third variation, the second driving event is predicted when the vehicle transmission has not been in the reverse gear for a threshold period of time (e.g., 10 seconds). However, the second driving event can be otherwise predicted.

Operating the sensor module components in the second mid-power mode S460 functions to place the components in the powered but less-than-fully-operating state. The sensor module is preferably operated in the mid-power mode as described for Block S160, but can be otherwise operated in the mid-power mode, or operated in a second mid-power mode distinct from the mid-power mode described for Block S160.

4.5 Sensor Module Operation in the Low-Power Mode.

Operating the sensor module in a low-power mode S500 functions to minimize power consumption by the sensor module components. Operating the sensor module in the low-power mode S500 is preferably performed after wirelessly transmitting the information set to the user device S300 (e.g., delaying performance of S500 until transmission completion, terminating transmission in response to receipt of the second trigger S520, etc.). Operating the sensor module in a low-power mode can include: receiving the second trigger S520 and operating the sensor module components in the low-power mode S560, but can alternatively or additionally include any other suitable process. However, the sensor module can be otherwise operated in the low-power mode.

S500 is preferably performed in response to receiving the second trigger S520 (e.g., occurrence of the second trigger event), but can alternatively be performed at any other suitable time. In one example, the sensor module is operated in the sleep mode when a reverse camera is no longer required (e.g., when the vehicle is parked, turned off, driving at high speeds, etc.). Receiving the second trigger S520 functions to indicate when the sensor module should be substantially shut down. Similar to driving event prediction, reception of the second trigger S520 can be determined based on one or more factor values; can be detected directly, indirectly, or determined in any other suitable manner; be detected probabilistically or deterministically; or be otherwise determined. For example, receiving the second trigger S520 can include determining that a wireless signal strength of the user device is less than a predetermined signal strength threshold.

In a first variation, the second trigger is received S520 when the vehicle speed exceeds a threshold speed (e.g., 10 mph), as determined from vehicle speedometer measurements, user device orientation sensor (e.g., accelerometer, gyroscope, etc.) measurements, user device location measurements, sensor module orientation sensor measurements, hub orientation sensor measurements, or any other suitable set of measurements (example shown in FIG. 7). In a second variation, the second trigger is received S520 when the sensor module has operated in the mid-power state for a threshold period of time (e.g., 60 seconds). In a third variation, the second trigger is received S520 when the engine is turned off. However, the second trigger can be otherwise received.

Operating the sensor module in the low-power mode S500 functions to operate the sensor module in a minimal power-consumption state. In the low-power mode, the sensor module preferably substantially shuts down by ceasing power provision to the sensors and high-power communication modules, powers a low-power communication module to maintain a communication channel with the hub, and can additionally power a power management circuit for the recharging system. The sensor module can additionally power a secondary processor (e.g., having more limited capabilities than the main processor and configured to selectively boot the main processor), power the main processor, and/or power any other suitable processing unit. Similar to operating the sensor module in the mid-power mode S400, operating the sensor module in the low-power mode S500 can include generating low-power operating instructions S540, transmitting the low-power operating instructions S550, and operating the sensor module components in the low-power mode S560 (e.g., according to low-power component instructions associated with the low-power operation mode). The instructions can be generated by the control center, by the sensor module, or by any other suitable computing system. Operating the sensor module components in the low-power mode S560 can include operating the wireless communication module in a low-power communication mode and operating the sensor or sensors in a low-power sensor mode. Operating the sensors in a low-power sensor mode preferably includes operating the sensors in a sleep state or other standby state or depowering the sensors entirely, but alternatively can include operating the sensors in any other suitable state.

Operating the wireless communication module in the low-power communication mode preferably includes powering off the high-power communication module (e.g., high-power radio) and continuing operation of the low-power communication module (e.g., low-power radio), preferably in order to receive operation instructions from and/or send operational information to the control center and/or user device, but can include any suitable communication module operation. Operating the wireless communication module in a low-power communication mode can include transmitting data below the threshold data transfer rate (e.g., using a radio and/or communication method incapable of exceeding the threshold data transfer rate, throttling data transfer to a rate below the threshold data transfer rate, transmitting no data, etc.). In one example, operating the wireless communication module in the low-power communication mode includes turning off the sensor module WiFi radio; maintaining BLE radio operation; and, using the BLE radio, receiving an operation instruction from the control center to operate the sensor module components in the mid-power mode. However, the wireless communication module can be otherwise operated in the low-power mode.

4.6 Energy Availability State Determination.

The method can additionally include determining an energy availability state S600. The energy availability state can be an estimated or projected state, a current state, a historical state, or be an energy availability state of any other suitable time. The energy availability state can be determined S600 based on sensor module power storage system parameters, recharging system parameters, vehicle parameters, user parameters, and/or user device parameters, and/or any other suitable parameters. The sensor module power storage system parameters, recharging system parameters, vehicle parameters, user parameters, and/or user device parameters can be substantially instantaneous parameter values (e.g., received from the sensor module over the low-power communication connection), estimated or projected parameter values (e.g., based on the last values received from the sensor module and/or a set of historical values; based on the last values and/or external data, such as a weather forecast for the current and/or predicted geographic location of the vehicle; based on historic solar exposure patterns; based on historic power use profiles for the vehicle or related population; based on a vehicle profile and/or user profile; based on a user input; etc.), historical parameter values, or be any other suitable set of parameter values. The energy availability state can be determined at the control center, the sensor module, the remote computing system, any other suitable component of the vehicle sensor system, the vehicle, the user device, and/or any other suitable device. The energy availability state can be calculated, determined probabilistically (e.g., using a neural network or other artificial intelligence module), heuristically, deterministically, stochastically, or otherwise determined.

An energy availability state can be compared to one or more threshold energy availability states. A threshold energy availability state can be a current or projected energy storage system state of charge (e.g., a percentage of total capacity such as 10%, a specific value such as 500 mAh, estimated based on an indicative factor such as battery voltage equal to a threshold voltage, etc.), a threshold state in which the sensor module is projected to have sufficient energy to continue functioning under default or present settings (e.g.; indefinitely; for a specific amount of time such as 1 minute, 1 hour, or 1 week; estimated with a certain probability such as 50%, 80%, or 95%; etc.). Based on a comparison of an energy availability state with one or more threshold energy availability states, the energy availability state can be classified (e.g., high, intermediate, low, very low, etc.), assigned a numerical score (e.g., a value between two extrema, such as 0 and 1), ranked (e.g., among historical energy availability states), associated with operation instructions (e.g., an instruction to operate a sensor module component in a specific power mode), and/or treated in any other suitable manner.

In a first variant, the energy availability state can be determined S600 based on weather forecast data and the state of charge of the battery. In a specific example of this variant, wherein the sensor module includes a solar energy harvesting system, a low future energy availability state can be predicted based on a low battery state of charge and weather forecast data indicating a high probability of cloud cover at the likely destination of the vehicle. In a second variant, the energy availability state can be determined S600 based on a historical data set associated with operation of the vehicle. In a first example of this variant, wherein the sensor module includes a solar energy harvesting system, a low future energy availability state can be predicted based on a low battery state of charge and a historical data set indicating that the user typically parks in a shaded location. In a second example of this variant, wherein the sensor module includes a solar energy harvesting system, a high future energy availability state can be predicted based on a historical data set indicating that sensor module power demands are typically low and that the user typically parks in an uncovered location, and weather forecast data indicating a high probability of direct sunlight at the uncovered location. In a third variant, a future energy availability state can be determined based on a user indication (e.g., indication received through the vehicle, user device, or sensor system), such as an indication that the user intends to charge the sensor module using an external power source or intends to park in a covered garage. In a fourth variant, a current energy availability state can be determined based on a current battery state of charge.

4.7 Automatic Operation Mode Adjustment to Accommodate for Limited on-Board Power.

The method can additionally include automatically controlling vehicle sensor system operation S700 to alter current, future, and/or projected power consumption and/or power storage system state of charge, which can function to accommodate for recharging system power fluctuations. This can be particularly desirable when the recharging system does not provide substantially constant power, when the recharging system generates power whether or not the power storage system is capable of storing the extra power, when the recharging system cannot be shut off or disconnected from the power storage system, and/or when recharging system disconnection from a power sink reduces the lifespan of the recharging system. For example, this can be desirable when the recharging system is a solar charging system.

Vehicle sensor system operation can be automatically controlled S700 based on the energy availability state (e.g., in response to predicting the energy availability state S600, based on a high or low projected energy availability state, etc.), the recharging system and/or power storage system parameters, and/or any other suitable factors. Vehicle sensor system operation can include sensor module operation, control center operation, and/or any other vehicle sensor system component operation. Vehicle sensor system operation can additionally or alternatively include using the vehicle sensor system to control a user device (e.g., to provide a notification to the user; to alter communication, data processing, and/or any other user device operation associated with the vehicle sensor system; etc.).

Figure 10:
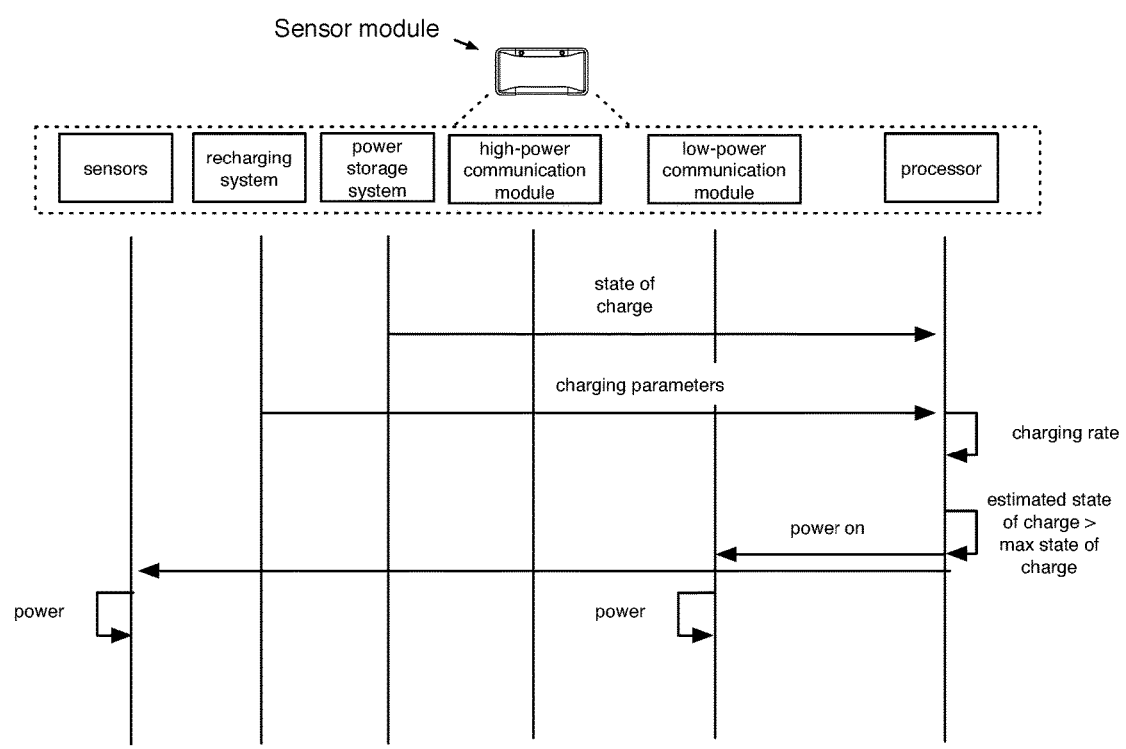
FIG. 10 is a schematic representation of a first specific example of recharging system accommodation.
Figure 11:
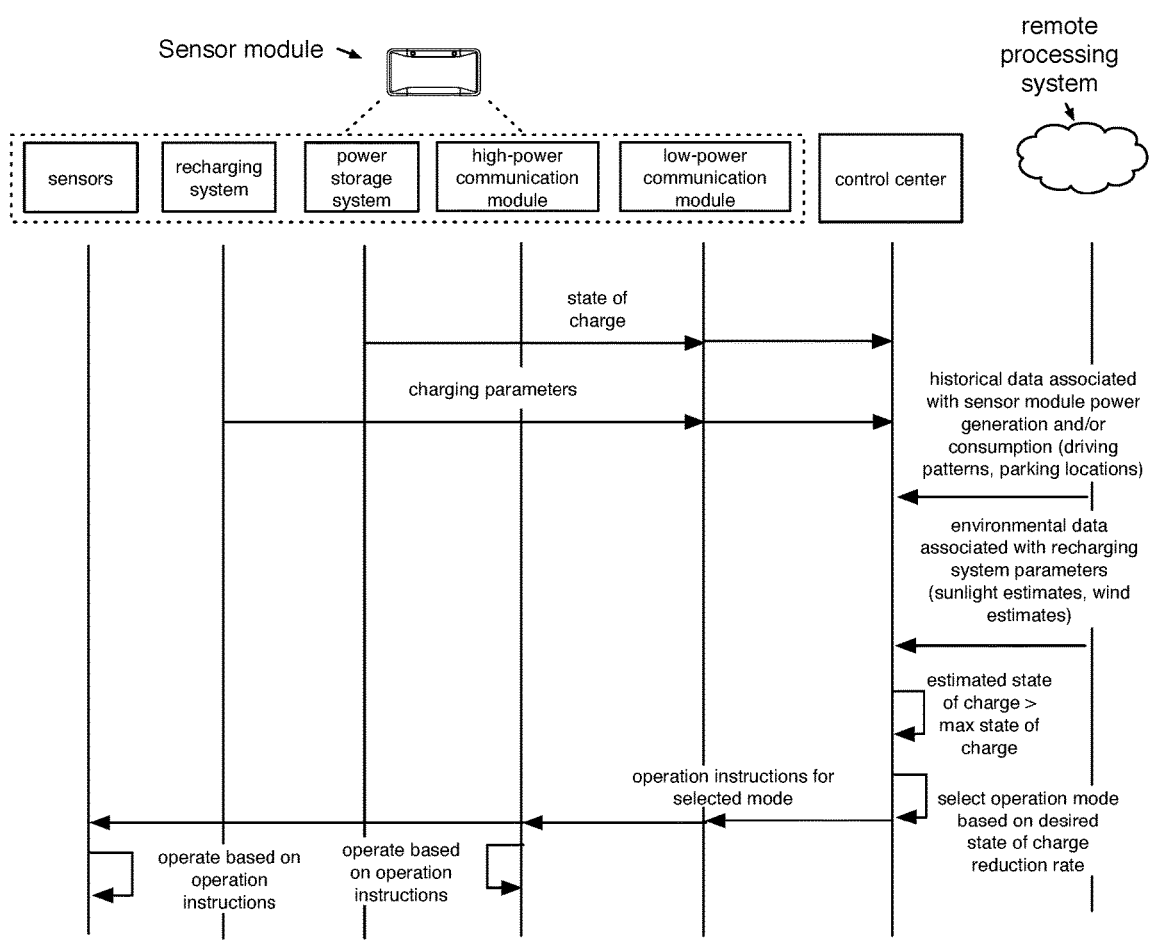
FIG. 11 is a schematic representation of a second specific example of recharging system accommodation.
Figure 12:
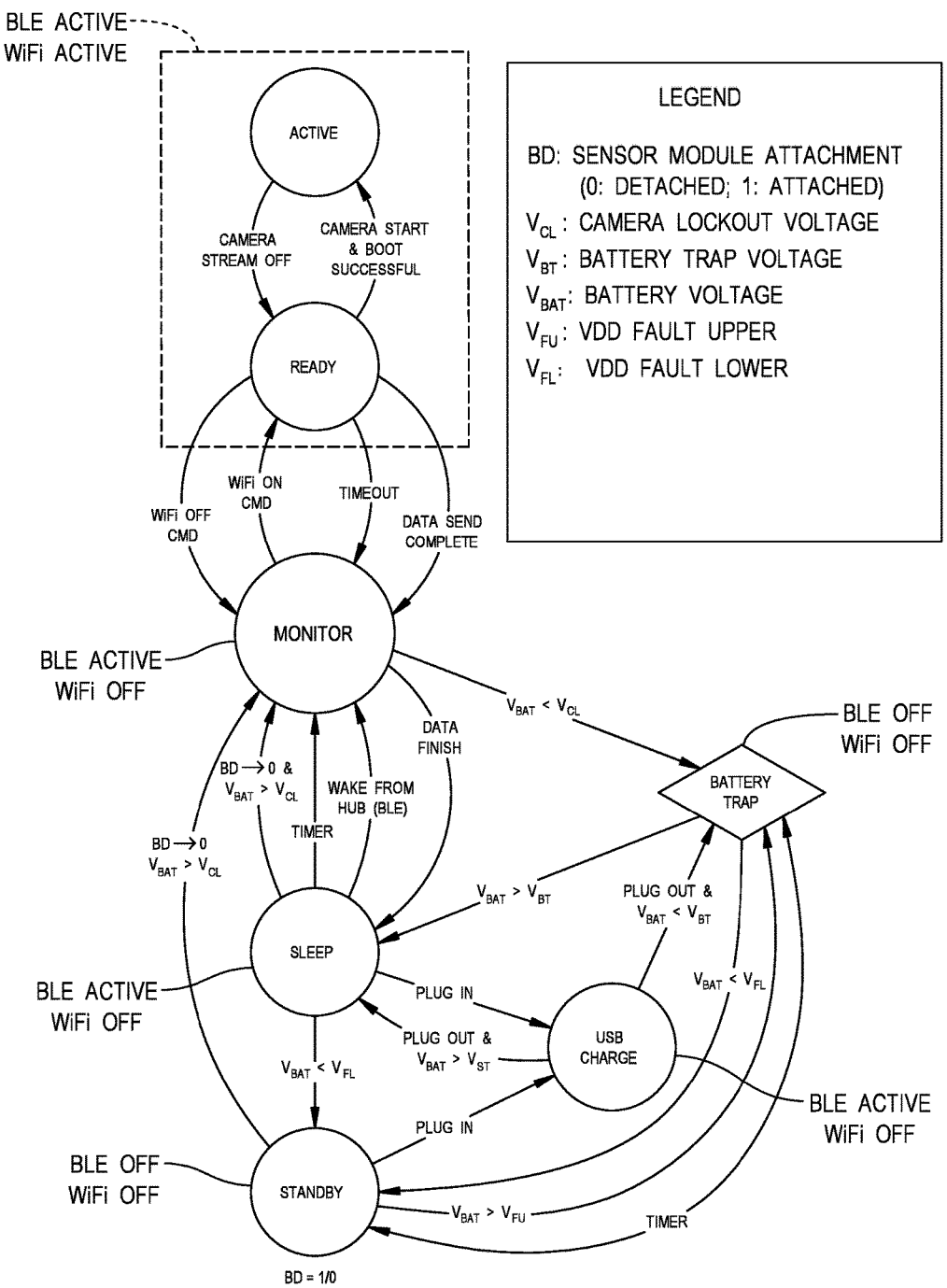
FIG. 12 is a schematic representation of an example state diagram for sensor module operation.

In one variation of S700, the sensor module automatically controls its own functionalities based on recharging system operation and/or power storage system parameters (example shown in FIG. 10). For example, the sensor module can automatically turn on and operate a mid- or high-power communication module or sensor and/or operate in a mid- or high-power mode in response to the power storage system state of charge exceeding a threshold state of charge and/or the recharging system energy provision rate exceeding a threshold rate. This can function to consume stored power, such that the power storage system will have sufficient capacity to store newly received power. In a first specific example, the sensor module can turn on the WiFi module and search for a connection when the power storage system state of charge exceeds 95% and the recharging system energy provision rate is nonzero. In a second specific example, the sensor module can turn on the WiFi module and cameras and stream video captured by the cameras to the control center and/or user device when the power storage system state of charge exceeds 98%. However, the sensor module can automatically control its own functionalities in any other suitable manner.

In a second variation, the control center controls sensor module operation based on the energy availability state (example shown in FIGURE ii). In this variation, the control center can: receive the power storage system parameters and/or recharging system parameters, determine whether excess power should be consumed, generate operation instructions to consume the estimated excess power at an estimated rate (e.g., projected rate), and transmit the operation instructions to the sensor module, wherein the sensor module selectively operates select components according to the operation instructions. The method can optionally include notifying a user, such as by: sending a notification to the client on the user device, wherein the client automatically displays the notification; sending a notification to the vehicle, wherein the vehicle automatically presents the notification; sending a notification to a remote computing system, wherein the remote computing system forwards the notification to a different endpoint (e.g., the user device, another user device, a home computer, a home notification system, etc.) or takes another action; or by any other suitable process. The notification can include the current or anticipated state of charge; recharging suggestions, such as parking instructions (e.g., park in a sunny location, park such that the energy harvesting system faces in a specific direction such as south, avoid parking such that the energy harvesting system is close to another vehicle, etc.) or manual recharging instructions; graphs of power use; or any other suitable information. However, excess power can be otherwise accommodated.

The method can additionally or alternatively include selectively adjusting vehicle sensor system operation to accommodate for a low or moderate energy availability state (e.g., moderate power storage system state of charge, low projected energy availability state, etc.). This can be particularly useful in the mid- or high-power operation modes. This preferably includes adjusting sensor module operation, but can additionally or alternatively include control center operation and/or operation of any other suitable vehicle sensor system component, and/or using the vehicle sensor system to control user device operation. Adjusting operation to accommodate for low or moderate energy availability state can include: selectively shutting off redundant or low-priority components (e.g., according to a prioritized list), decreasing high-power component operation loads (e.g., reducing sensor sampling rates, such as reducing the camera frame rate; reducing the size of the data set to be transmitted, such as by downscaling sampled images; reducing the communication rate, such as reducing the frequency of packet transmission through the WiFi communication channel; etc.), shifting operation to a lower-power component with similar capabilities (e.g., streaming video over Bluetooth instead of WiFi), or otherwise adjusting sensor module operation. For example, in response to determining a low energy availability state, the sensor module can reduce the data transfer rate and/or total amount of data to be transmitted (e.g., removing less important data from the data set, decreasing an average framerate of images of an image data set, decreasing the resolution of images of an image data set, etc.) while operating the wireless communication module in the high-power communication mode. In a specific example, a low future energy availability state can be predicted based on a low battery state of charge and a user profile indicating that the sensor module will likely be parked in a garage. In this specific example, in response to predicting the low future energy availability state, before using a high-power radio to transmit a data set including a video, the sensor module can remove alternating frames from the video and reduce the resolution of the remaining frames. The amount by which the resolution of the remaining frames is reduced can be determined based on the energy availability state (e.g., a greater reduction in resolution for a lower energy availability state), the sensor module operation mode, and/or any other suitable factors. Alternatively, in this specific example, in response to predicting the future low energy availability state and predicting little to no near-term system use (e.g., low probability of driving event occurrence within a threshold period of time), the system can instruct the sensor module to directly operate in the low-power mode, instead of entering the mid-power mode before entering the low-power mode.

In a first variation, component operation is continuously adjusted (e.g., lower and lower priority components are shut off, transmission and sampling rates are continuously decreased, etc.) until the power consumption rate can be supported by the amount of power stored in the power storage system for an estimated period of time, wherein the estimated period of time can be determined from a user driving profile (e.g., be the average time that a reversing maneuver takes for the user, be the maximum time that a reversing maneuver takes for the user, etc.), be a universal constant, or be otherwise determined. In a second variation, the components to be operated and/or operation parameter settings can be optimized through an optimization or cost-value function, based on the component power consumption rates for each setting, estimated component operation time (e.g., estimated in the manner disclosed above), and power storage system state of charge. However, the sensor module operation can be otherwise adjusted to accommodate for a low state of charge.

The method can additionally or alternatively include adjusting criteria associated with transitioning between power modes (e.g., transitioning sensor module operation between the low-, mid-, and high-power modes) based on an energy availability state. In a first variation, a probability threshold can be determined based on the energy availability state (e.g., an energy availability state determined based on the battery state of charge and a historical data set associated with operation of the vehicle), such as dynamically adjusting the probability threshold based on the energy availability state. In a specific example of this variation, a high energy availability state can be predicted based on a moderate battery state of charge and data indicating that the power demand on the sensor module during a driving session with the user is typically low. In this example, in which determining a driving state predictive of a driving event S120 includes determining that the probability of the driving event exceeds a probability threshold, the probability threshold can be decreased in response to determining the high energy availability state. In a second variation, based on the energy availability state, driving status factors (e.g., driving states, driving events, triggers, etc.) can be added to or removed from a set of factors that satisfy criteria for transitioning between power modes. For example, based on determining a very low energy availability state, a sensor module transition out of the high-power mode can be made immediately in response to detecting a transmission state change out of a reverse gear (e.g., whereas detecting such a transmission state change during a higher energy availability state will not result in an immediate sensor module power mode transition). However, criteria associated with transitioning between power modes can be adjusted in any other suitable manner.

The method can additionally or alternatively include operating the sensor module, hub, and/or any other suitable components of the vehicle sensor system in different power modes based on internal controls (e.g., operating the sensor module in a low-power mode based on a sensor module timeout after an elapsed period of time without communication from the control center), based on communications from and/or detection of other systems (e.g., other sensor modules, other user devices, roadway-adjacent beacons, etc.), and/or based on any other suitable factors.

4.9 Control Center Operation in a Plurality of Operation States.

Figure 13:
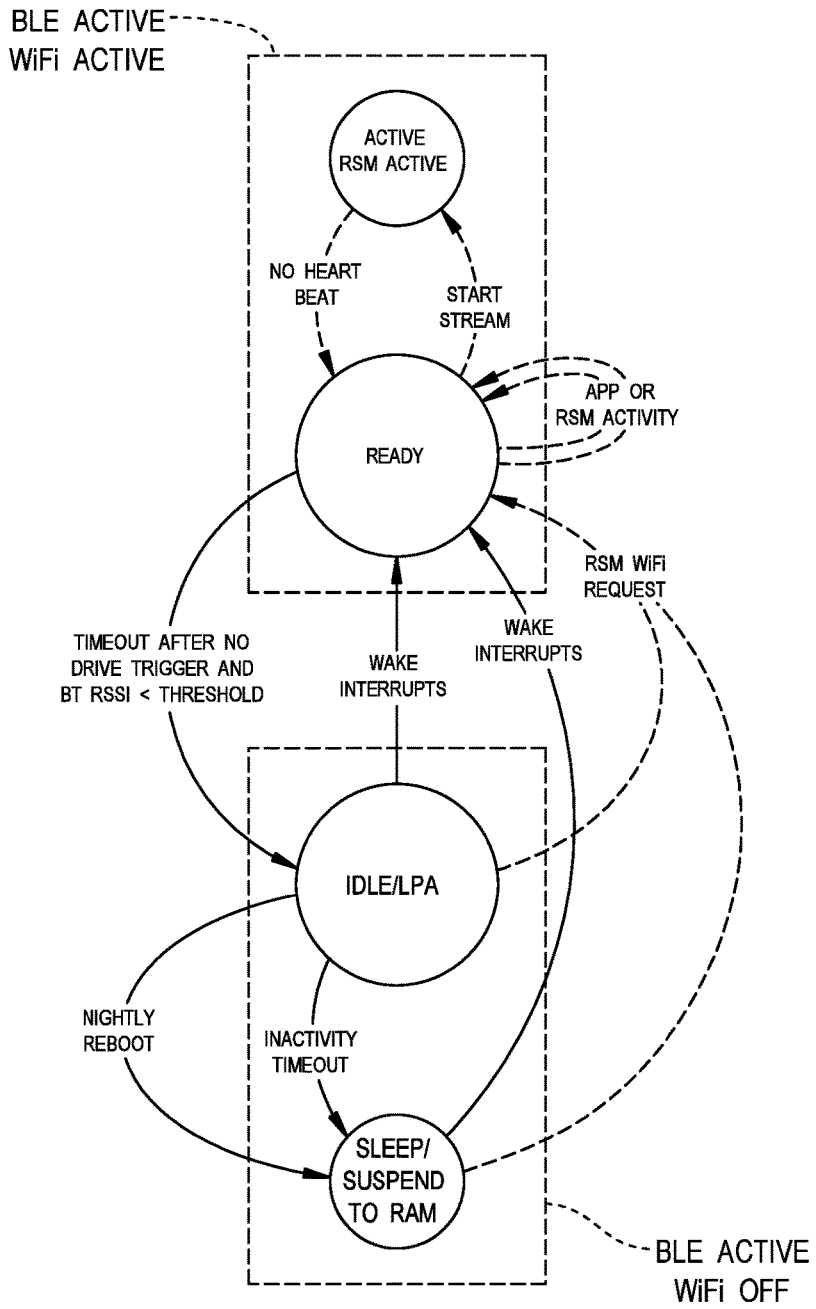
FIG. 13 is a schematic representation of an example state diagram for hub operation.

The method can additionally include operating the control center (e.g., hub) in a plurality of operation states (example shown in FIG. 13), which can function to reduce power consumed by control center operation and ensure that the control center does not deplete the vehicle battery. The different operation states preferably correspond to different levels of control center power consumption (e.g., high-power state, mid-power state, low-power state, sleep state, etc.), and can correspond to operating different control center components in different manners (e.g., turning a first component off in the sleep state and on in the low-, mid-, and high-power states, operating a second component in a manner than consumes less power when in the mid-power state than when in the high-power state, etc.). The control center can transition between the different operation states in response to internal triggers (e.g., timers, control center sensor readings, results of control center processing, etc.), vehicle triggers (e.g., vehicle CAN bus power status, vehicle sensor readings received through the CAN bus, etc.), sensor module and/or user device triggers (e.g., requests received from the sensor module or user device, sensor module or user device readings, etc.), external triggers (e.g., requests received from a remote computing system, data from an external source, etc.), determination of a driving state (e.g., S120, S420, etc.), reception of a trigger related to sensor module operation (e.g., S220, S520, etc.), sensor module operation state (e.g., S160, S260, S460, S560, etc.) or operating state transition (e.g., from low- to mid-power sensor module operation, from high- to low-power sensor module operation, etc.), and/or in response to any other suitable factors. The sensor module and control center operation states can be linked (e.g., operating together in corresponding operation states such as low-, mid-, or high-power), operated with some mutual association, operated independently of each other, or operated in any other suitable manner.

Additionally or alternatively, operating the control center in a plurality of operation states can include operating one or more control center components in a plurality of operation states. For example, a control center processing module, control center sensor module, and control center communications module can all be independently operable in several different power states (e.g., off state, on state, low-power state, mid-power state, high-power state, etc.).

In one variation, the control center typically operates in an idle or sleep state when the vehicle is off, transitioning from idle to sleep after the vehicle remains off for more than a threshold inactivity time period (e.g., predetermined time period such as 1 week; determined based on vehicle identifiers such as make, model, and/or year; determined based on current and/or historical vehicle characteristics such as vehicle battery quality and/or state of charge; determined based on historical user and/or vehicle behavior such as driving session length and/or time between driving sessions; etc.). In this variation, the control center can transition from the idle or sleep state into a ready state in response to receiving a wake trigger. A wake trigger can be a control center sensor reading (e.g., an accelerometer reading greater than a threshold value such as 0.128 g, a microphone reading greater than a threshold volume, etc.), a trigger received by wireless communication (e.g., a connection to a user device, sensor module, or vehicle; a request from a user device, sensor module, or vehicle; etc.), a trigger received through the vehicle CAN bus (e.g., an indication that the vehicle is on, a vehicle sensor reading, a request from the vehicle, etc.), or any other suitable trigger. In this variation, the control center can transition from the ready state to an active state in response to an activate trigger (e.g., an information set streaming request), and transition from the active state to the ready state in response to a deactivate trigger (e.g., loss of connection to a user device or sensor module). In this variation, the control center can transition from the ready state to the idle state in response to an idle trigger (e.g., time elapsed without a wake trigger, loss of connection to a user device or sensor module, etc.).

In an example of this variation, the information set is generated based on the data set S320 at the control center and the control center is capable of wirelessly communicating with the sensor module using both WiFi and BLE. In this example, the control center BLE radio is active in all operation states, while the control center WiFi radio is not operated in the sleep and idle states, and hosts a WiFi network that can be connected to by the sensor module and user device in the ready and active states. In this example, the processing module of the hub operates at or near its full processing capacity in the active mode, and consumes less power in the sleep, idle, and ready modes than in the active mode.

Embodiments can include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method for power management for a retrofit sensor system for a vehicle, the method comprising:
    at a control center attached to the vehicle, determining a driving state, the driving state predictive of a driving event;
    in response to determining the driving state, at the control center, wirelessly transmitting a first command to operate in a mid-power mode to a sensor module attached to the vehicle, the sensor module comprising: a sensor, an energy storage module, an energy harvester, and a wireless communication module;
    in response to receiving the first command, at the sensor module, operating the wireless communication module in a mid-power communication mode;
    at the control center, receiving a trigger from the vehicle;
    in response to receiving the trigger, at the control center, wirelessly transmitting a second command to the sensor module to operate in a high-power mode;
    in response to wirelessly transmitting the second command, at the sensor module:
        operating the sensor in a high-power sensor mode, comprising sampling a data set;
        operating the wireless communication module in a high-power communication mode, the high-power communication mode comprising transmitting data above a threshold data transfer rate; and
        transmitting the data set to the control center while operating in the high-power communication mode;
    at the control center, wirelessly transmitting the data set to a user device within the vehicle;
    after wirelessly transmitting the data set to the user device, at the control center, wirelessly transmitting a third command to the sensor module to operate in a low-power mode; and
    in response to receiving the third command, at the sensor module:
        operating the sensor in a low-power sensor mode; and
        operating the wireless communication module in a low-power communication mode comprising transmitting data below the threshold data transfer rate.

2. The method of claim 1, further comprising, at the control center, before wirelessly transmitting the data set to the user device, modifying the data set.

3. The method of claim 1, wherein:
    the energy storage module comprises a battery;
    the energy harvester comprises a solar cell;
    the sensor comprises a camera;
    the data set comprises an image data set;
    the driving event is a vehicle reversing event; and
    the trigger comprises an indication received from the user.

4. The method of claim 3, further comprising:
    predicting an energy availability state based on weather forecast data and a state of charge of the battery; and
    in response to predicting the energy availability state, controlling the user device to provide a notification to charge the battery.

5. The method of claim 1, wherein determining the driving state is based on a historical data set associated with operation of the vehicle.

6. The method of claim 5, wherein the historical data set comprises data associated with an occurrence time of a vehicle operation event.

7. The method of claim 1, wherein the energy storage module comprises a battery, the method further comprising, at the sensor module:
    in response to determining that a state of charge of the battery is less than a first threshold state of charge, operating the wireless communication module in a standby communication mode;
    after operating the wireless communication module in the standby communication mode, determining that the state of charge of the battery is greater than a second threshold state of charge, wherein the first threshold state of charge is less than the second threshold state of charge; and
    in response to determining that the state of charge of the battery is greater than the second threshold state of charge, operating the wireless communication module in the low-power communication mode.

8. The method of claim 1, wherein:
the energy storage module comprises a battery; and
the sensor module is removably attached to the vehicle;
the method further comprising, at the sensor module:
in response to determining that a state of charge of the battery is less than a first threshold state of charge, operating the wireless communication module in a standby communication mode, the wireless communication module consuming less power when operating in the standby communication mode than when operating in the low-power communication mode;
after operating the wireless communication module in the standby communication mode, detecting detachment of the sensor module from the vehicle; and
in response to detecting removal of the sensor module from the vehicle, operating the wireless communication module in the low-power communication mode.

9. The method of claim 1, wherein:
the wireless communication module comprises a low-power radio and a high-power radio;
operating the wireless communication module in the low-power communication mode further comprises receiving a first operation instruction from the control center using the low-power radio;
operating the wireless communication module in the mid-power communication mode further comprises:
establishing a high-throughput wireless connection with the control center using the high-power radio; and
receiving a second operation instruction from the control center using the low-power radio; and
operating the wireless communication module in the high-power communication mode further comprises:
transmitting the data set to the control center using the high-power radio; and
receiving a third operation instruction from the control center using the low-power radio.

10. The method of claim 9, wherein the second and third operation instruction comprise the second and third command, respectively.

11. The method of claim 1, wherein:
the control center comprises an accelerometer; and
determining the driving state is based on data sampled by the accelerometer.

12. A method for power management for a retrofit sensor system for a vehicle, the method comprising:
determining a driving state, the driving state predictive of a driving event;
in response to determining the driving state, at a sensor module attached to the vehicle, operating a wireless communication module in a mid-power communication mode, the retrofit sensor system comprising the sensor module, the sensor module comprising: a camera, a battery, a solar energy harvester, and the wireless communication module;
at the retrofit sensor system, receiving a trigger;
in response to receiving the trigger, at the sensor module:
operating the camera in a high-power camera mode, the high-power camera mode comprising sampling an image data set;
operating the wireless communication module in a high-power communication mode, the high-power communication mode comprising transmitting data above a threshold data transfer rate; and
wirelessly transmitting an information set based on the image data set to a user device within the vehicle;
after wirelessly transmitting the information set to the user device, at the sensor module:
operating the camera in a low-power camera mode; and
operating the wireless communication module in a low-power communication mode comprising transmitting data below the threshold data transfer rate.

13. The method of claim 12, wherein the trigger is received from the user device.

14. The method of claim 12, wherein operating the sensor module in the low-power mode is performed in response to, at the retrofit sensor system, determination that a wireless signal strength of the user device is less than a predetermined signal strength threshold.

15. The method of claim 12, further comprising, before operating the sensor module in the low-power mode:
predicting an energy availability state based on a state of charge of the battery and a historical data set associated with operation of the vehicle; and
in response to determining that the energy availability state is less than a threshold energy availability state, reducing the power used when operating in the high-power mode.

16. The method of claim 15, wherein reducing the power used when operating in the high-power mode comprises decreasing an average framerate of images of the image data set.

17. The method of claim 12, further comprising predicting an energy availability state based on a state of charge of the battery and a historical data set associated with operation of the vehicle, wherein determining the driving state comprises:
determining a probability threshold based on the energy availability state; and
determining that a probability of the driving event exceeds the probability threshold.

18. The method of claim 17, further comprising, in response to predicting the energy availability state, controlling the user device to provide a notification to charge the battery.

19. The method of claim 12, wherein the information set is the image data set, further comprising, at the retrofit sensor system, controlling the user device to display the image data set.

20. The method of claim 12, wherein:
wirelessly transmitting the information set to the user device comprises wirelessly transmitting the image data set to a control center attached to the vehicle while operating the wireless communication module in the high-power communication mode; and
the method further comprises, at the control center, in response to receiving the image data set:
generating the information set based on the image data set; and
wirelessly transmitting the information set to the user device.

* * * * *